(12) United States Patent
Watanabe et al.

(10) Patent No.: US 6,226,478 B1
(45) Date of Patent: *May 1, 2001

(54) PROCESS CARTRIDGE HAVING DRIVE MOUNT FOR PHOTOSENSITIVE DRUM

(75) Inventors: Kazushi Watanabe, Mishima; Yoshihiro Ito, Yokohama; Toshiharu Kawai, Susono, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/820,481

(22) Filed: Mar. 18, 1997

(30) Foreign Application Priority Data

Mar. 21, 1996 (JP) .................................................... 8-064105
Sep. 26, 1996 (JP) .................................................... 8-277528

(51) Int. Cl.[7] .................................................. G03G 15/00
(52) U.S. Cl. ........................................ 399/117; 399/167
(58) Field of Search .................................... 399/117, 167, 399/116; 403/361, 383; 492/15; 464/179, 182

(56) References Cited

U.S. PATENT DOCUMENTS

| 3,213,719 | 10/1965 | Kloack ..................................... 81/71 |
| 3,536,397 | * 10/1970 | Wagner . |
| 3,734,548 | * 5/1973 | Kieves . |
| 3,815,380 | * 6/1974 | Esmay ................................. 464/173 |
| 4,025,210 | * 5/1977 | Johnson ............................... 403/240 |
| 4,454,922 | 6/1984 | Jamison et al. ....................... 175/323 |
| 4,621,919 | * 11/1986 | Nitanda et al. ....................... 399/117 |
| 4,922,297 | * 5/1990 | Kondo .................................. 399/117 |

(List continued on next page.)

FOREIGN PATENT DOCUMENTS

| 0251693 | 1/1988 | (EP) . |
| 0735432 | 10/1996 | (EP) . |
| 2214609 | 9/1989 | (GB) . |

*Primary Examiner*—Robert Beatty
(74) *Attorney, Agent, or Firm*—Fitzpatrick, Cella, Harper & Scinto

(57) ABSTRACT

An electrophotographic image forming apparatus for forming an image on a recording material includes an electrophotographic photosensitive drum, a charging device for charging the photosensitive drum, a developing device for developing a latent image formed on the photosensitive drum into a toner image, a transfer device for transferring the toner image onto the recording material, a fixing device for fixing the toner image on the recording material, a motor, and a main assembly side gear for receiving driving force from the motor. A recess is formed substantially at a center of the gear, the recess having a polygonal cross-section, and a projection is provided at a longitudinal end of the photosensitive drum, wherein when the main assembly side gear rotates with the recess and projection engaged with each other, rotational driving force is transmitted from the gear to the photosensitive drum through the recess and the projection with the projection being pulled into the recess, wherein a free end of the projection and a bottom surface of the recess are contacted to each other so that the process cartridge is positioned in place in a longitudinal direction of the photosensitive drum relative to the main assembly. A moving device imparts relative movement between the recess and the projection in a longitudinal direction of the photosensitive drum to engage the projection with the recess.

83 Claims, 21 Drawing Sheets

U.S. PATENT DOCUMENTS

| | | | |
|---|---|---|---|
| 4,975,743 | 12/1990 | Surti | 355/211 |
| 4,989,037 * | 1/1991 | Nagatsuna | 399/167 |
| 5,019,861 | 5/1991 | Surti | 355/200 |
| 5,095,335 | 3/1992 | Watanabe et al. . | |
| 5,132,728 * | 7/1992 | Suzaki et al. | 399/167 |
| 5,151,734 | 9/1992 | Tsuda et al. . | |
| 5,280,224 | 1/1994 | Sagara | 318/265 |
| 5,284,455 * | 2/1994 | Kuribayashi | 464/105 |
| 5,345,294 | 9/1994 | Nomura et al. . | |
| 5,402,207 * | 3/1995 | Michlin | 399/117 |
| 5,452,064 | 9/1995 | Inomata | 355/271 |
| 5,463,446 | 10/1995 | Watanabe et al. . | |
| 5,597,261 * | 1/1997 | Hayashi | 403/354 |
| 5,602,623 | 2/1997 | Nishibata et al. | 399/111 |
| 5,608,509 | 3/1997 | Shirai et al. | 399/351 |
| 5,659,847 | 8/1997 | Tsuda et al. | 399/113 |
| 5,740,500 * | 4/1998 | Hashimoto | 399/114 |
| 5,749,028 * | 5/1998 | Damji et al. | 399/117 |
| 5,768,658 * | 6/1998 | Watanabe et al. | 399/111 |
| 5,903,803 * | 5/1999 | Kawai et al. . | |

\* cited by examiner (a)

(b)

PROCESS CARTRIDGE HAVING DRIVE MOUNT FOR PHOTOSENSITIVE DRUM

FIELD OF THE INVENTION AND RELATED ART

The present invention relates to a process cartridge and an electrophotographic image forming apparatus. Here, the electrophotographic image forming apparatus refers to an apparatus using an electrophotographic image formation type process to form an image on a recording medium. Examples of the electrophotographic image forming apparatus include an electrophotographic copying machine, an electrophotographic printer (laser beam printer, LED printer or the like), a facsimile device and a word processor.

Here, the process cartridge may be a cartridge which is detachably mountable to a main assembly of an image forming apparatus and which contains as an unit an electrophotographic photosensitive member and at least one of process means such as charging means, developing means, cleaning means or the like. The process cartridge may be a cartridge which is detachably mountable to a main assembly of an image forming apparatus and which contains as an unit an electrophotographic photosensitive member and a process means such as charging means, developing means, cleaning means or the like. The process cartridge may be a cartridge which is detachably mountable to a main assembly of an image forming apparatus by a user and which contains as an unit an electrophotographic photosensitive member and developing means. Since the process cartridge is detachably mountable relative to the main assembly of the device, the maintenance of the device is easy.

An electrophotographic image forming apparatus of the electrophotographic image formation type designed such that a latent image is formed by selectively exposing the electrophotographic photosensitive member, uniformly charged by charging means, to image information light. The latent image is developed with toner by a developing means into a toner image. The toner image thus formed is transferred onto a recording medium by transferring means to form an image on the recording material.

When the process cartridge is mounted to the main assembly of the image forming apparatus, the process cartridge position is desirably precise.

SUMMARY OF THE INVENTION

Accordingly, it is a principal object of the present invention to provide a process cartridge and an electrophotographic image forming apparatus wherein when a process cartridge is mounted to the main assembly of the apparatus, the process cartridge can be correctly positioned to the main assembly of the apparatus.

It is another object of the present invention to provide a process cartridge and an electrophotographic image forming apparatus wherein when the process cartridge is mounted to the main assembly, the process cartridge is correctly positioned to the main assembly of the apparatus in the longitudinal direction of the photosensitive drum.

It is a further object of the present invention to provide a process cartridge and an electrophotographic image forming apparatus wherein when the process cartridge is mounted to the main assembly of the apparatus, a photosensitive drum can be rotated through a coupling.

It is a further object of the present invention to provide a process cartridge and an electrophotographic image forming apparatus wherein the position of the process cartridge relative to the main assembly of the apparatus in the longitudinal direction of the photosensitive drum is determined by the abutment between a free end surface of a projection and a bottom surface of a recess.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described in conjunction with the accompanying drawings.

Embodiment 1

Referring to FIG. 1 to FIG. 10, a description will be provided as to a process cartridge and an electrophotographic image forming apparatus to which it is detachably mountable according to embodiment 1. In the following description, the general arrangement of the process cartridge and the electrophotographic image forming apparatus usable therewith will be first described referring to FIG. 1 to FIG. 6, and then the structure of a coupling of a driving force transmission mechanism between the process cartridge and the image forming apparatus, will be described referring to FIG. 7 to FIG. 10.

{General Arrangement}

Figure 1:
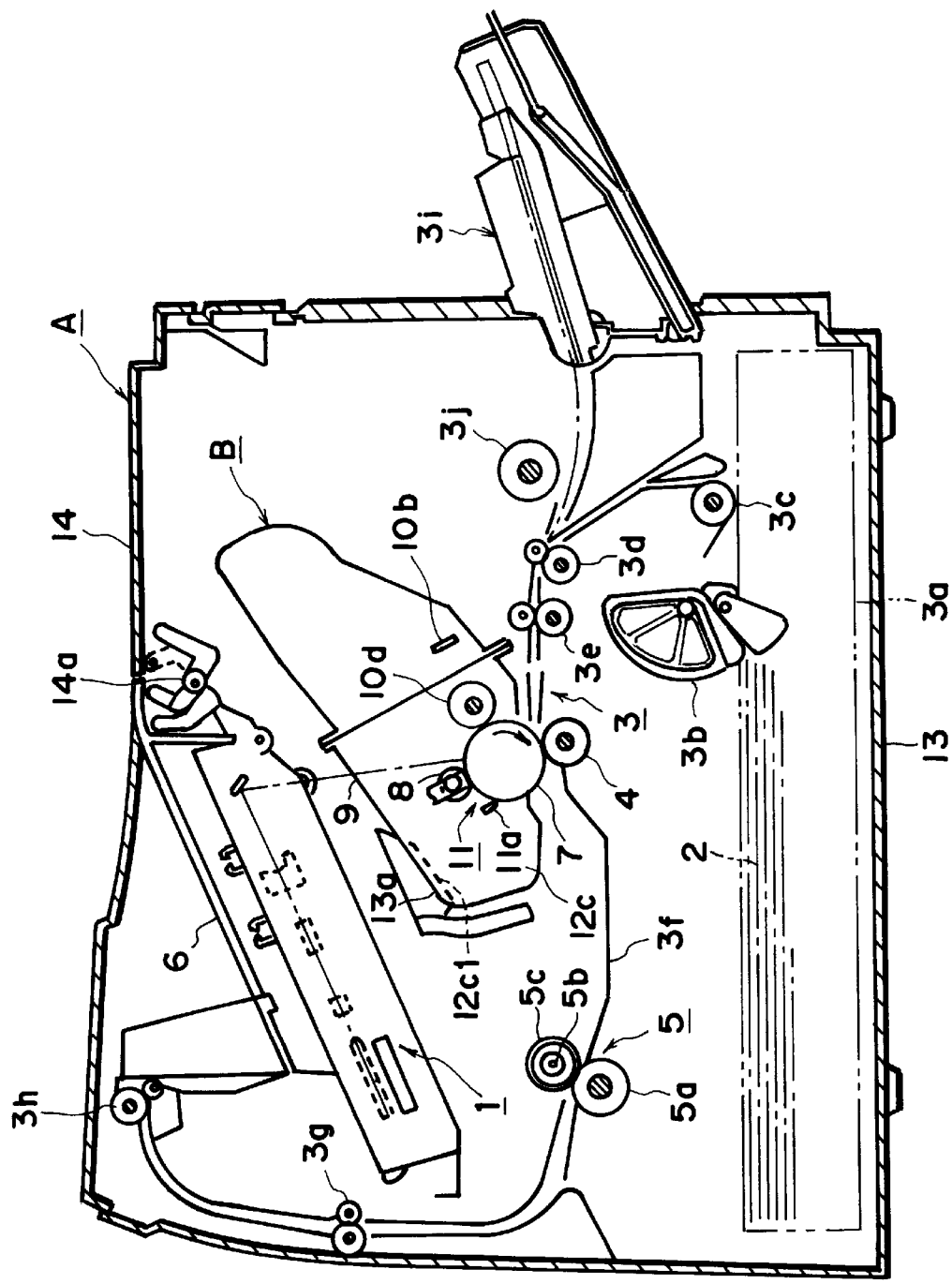
FIG. 1 is a cross-sectional view of an electrophotographic image forming apparatus according to an embodiment of the present invention.
Figure 2:
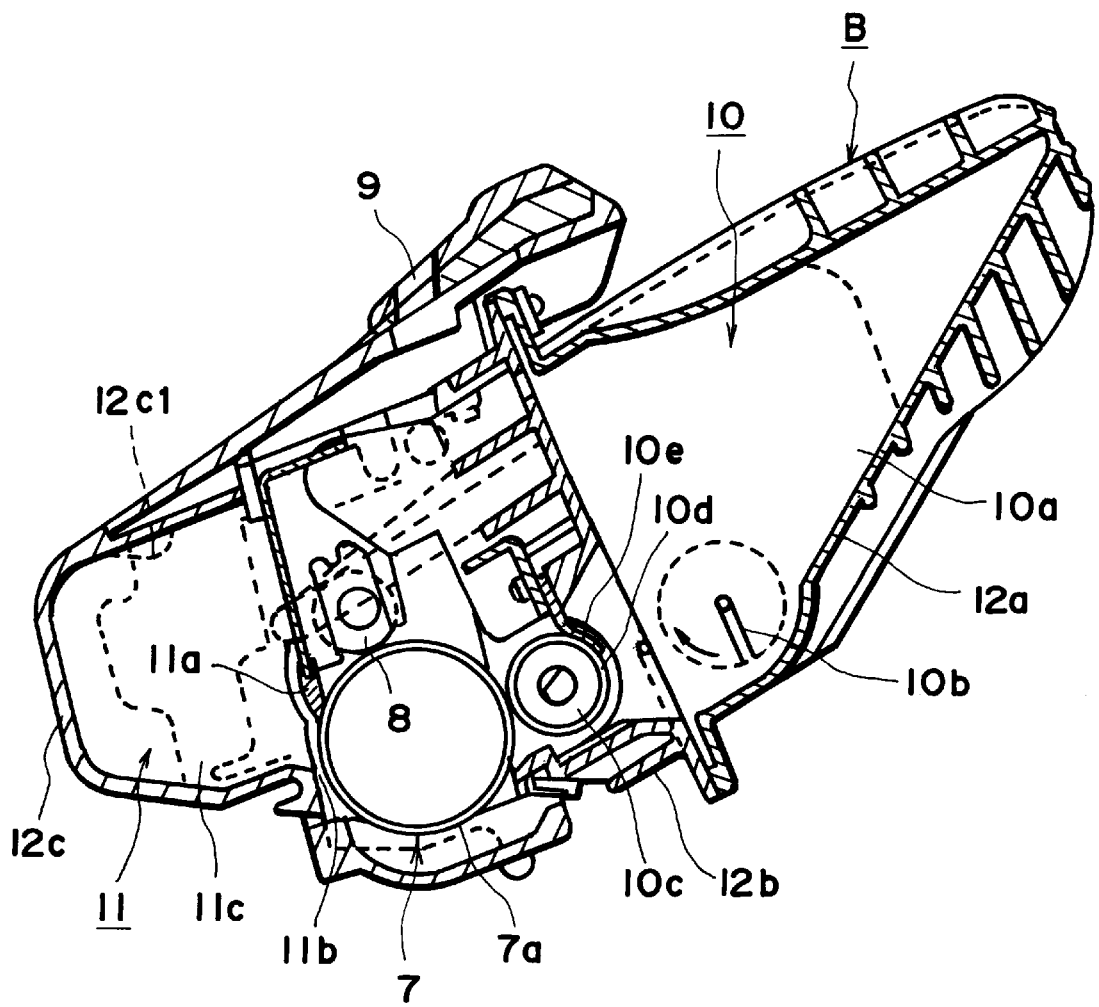
FIG. 2 is a cross-sectional view of a process cartridge according to an embodiment of the present invention.
Figure 3:
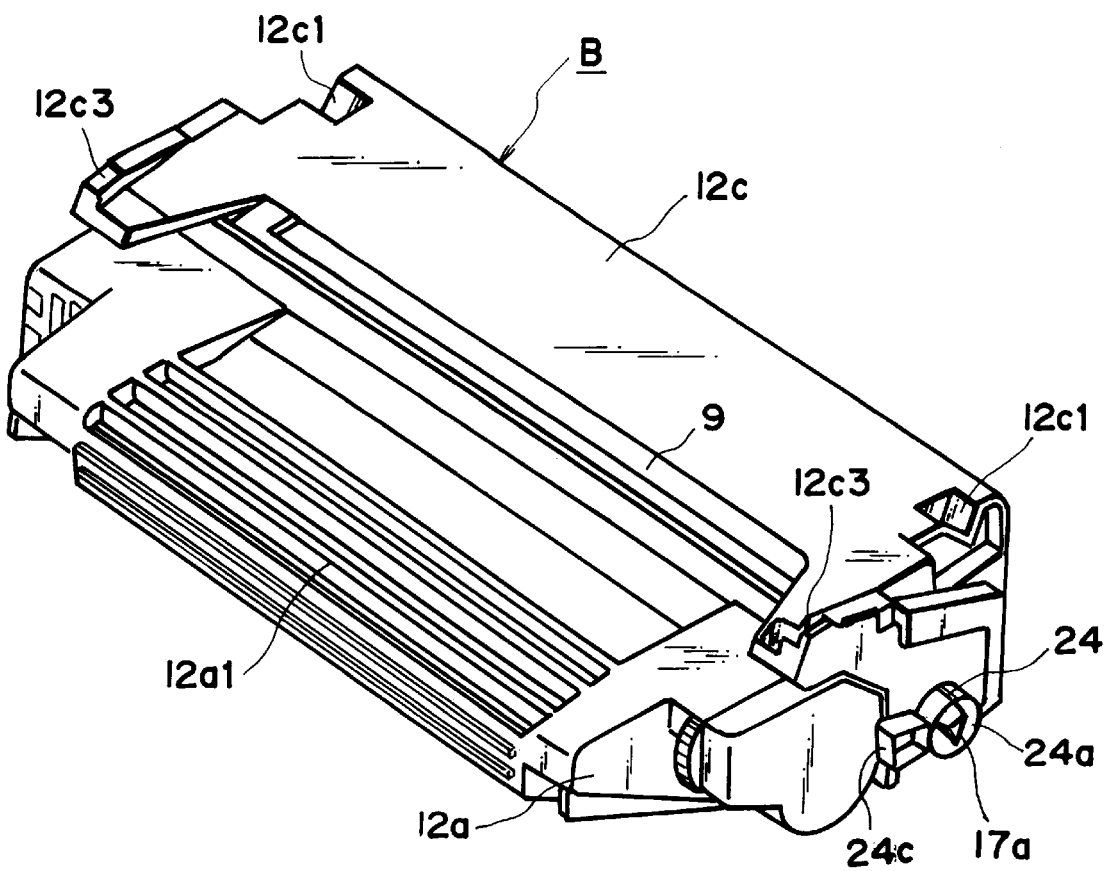
FIG. 3 is perspective view a process cartridge according to an embodiment of the present invention.
Figure 4:
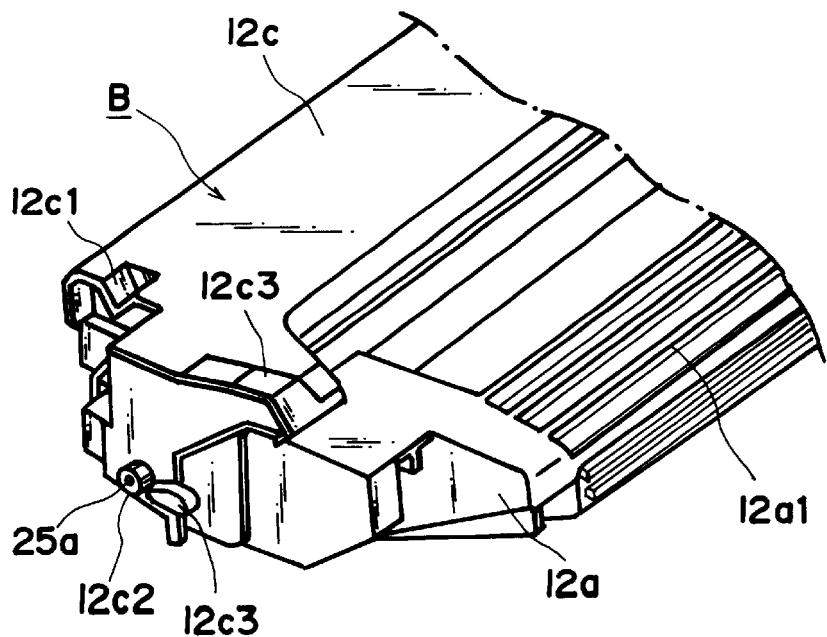
FIG. 4 is a perspective view of a process cartridge according to an embodiment of the present invention.
Figure 5:
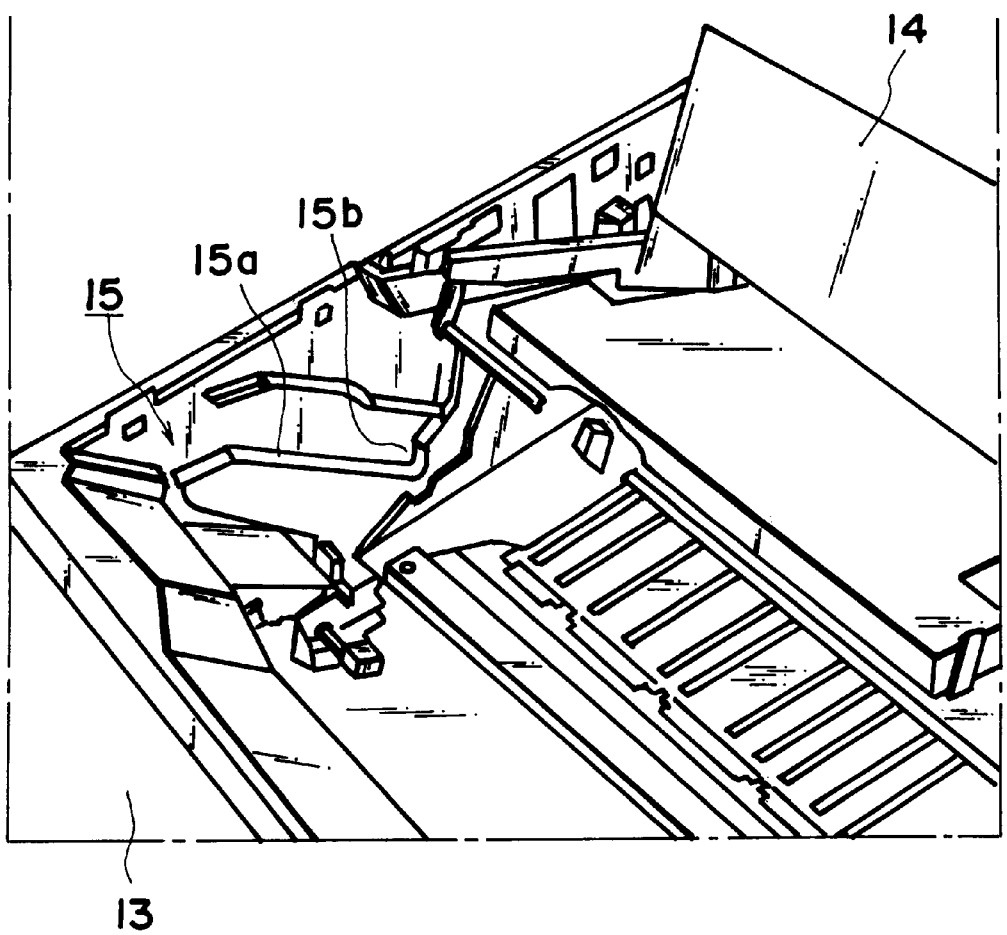
FIG. 5 is a perspective view of a process cartridge mounting portion of a main assembly of an electrophotographic image forming apparatus according to an embodiment of the present invention.
Figure 6:
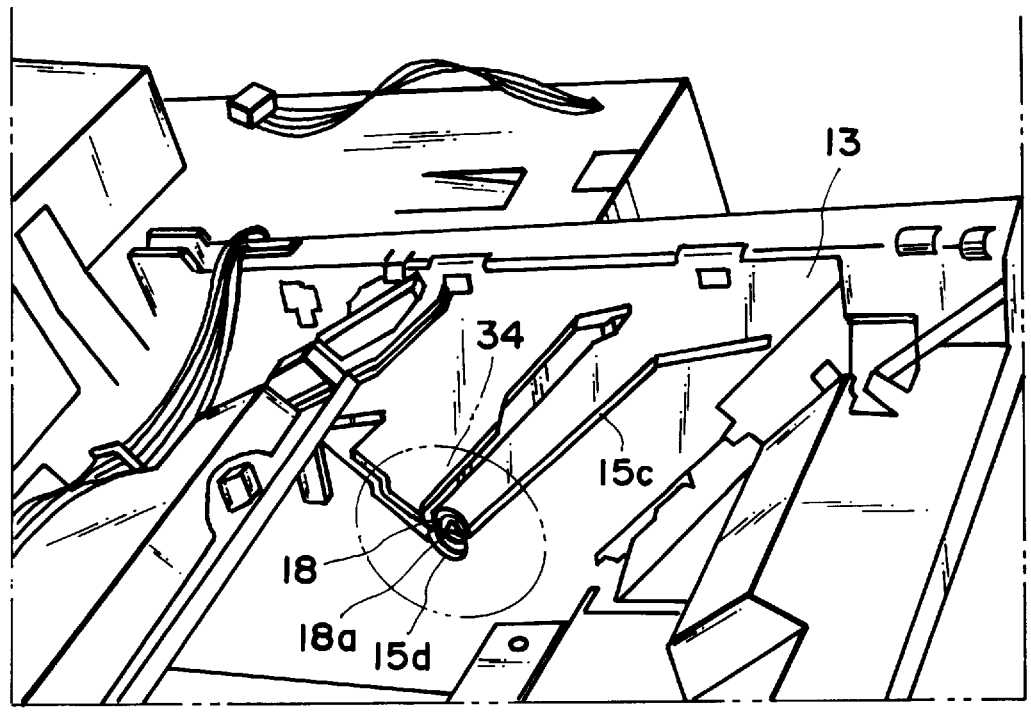
FIG. 6 is a perspective view of a process cartridge mounting portion of a main assembly of an electrophotographic image forming apparatus according to an embodiment of the present invention.

FIG. 1 is a schematic view of the electrophotographic image forming apparatus A to which the process cartridge is mounted; FIG. 2 is a cross-sectional view of the process cartridge B; FIG. 3 and 4 are perspective views of the outer appearance of the process cartridge; and FIGS. 5 and 6 illustrate device structures for mounting the process cartridge to the main assembly of the device.

In this electrophotographic image forming apparatus (laser beam printer in the embodiment), as shown in FIG. 1, an electrophotographic photosensitive member 7 of a drum configuration is exposed to a laser beam based on image information supplied from an optical system 1 so that a latent image is formed on the photosensitive member, and the latent image is developed with toner into a toner image. In synchronism with the formation of the toner image, a recording medium 2 (recording sheet or the like) is fed from a feeding cassette 3a by transporting means 3 comprising pick-up rollers 3b, feeding rollers 3c, feeding rollers 3d, registration rollers 3e or the like. The toner image formed on the photosensitive drum 7 is transferred onto the recording medium 2 by voltage application to the transfer roller 4 as transferring means. The recording medium 2 is guided by a guide plate 3f to a fixing means 5. The fixing means 5 comprises a fixing roller 5c comprising a driving roller 5a and a heater 5b, and applies heat and pressure to the recording medium 2 to fix the transferred toner image onto the recording medium 2. The recording medium 2 is fed by the discharging rollers 3g and 3h, and is discharged to the discharging portion 6 through a reversion feeding path. In the image forming apparatus A, manual sheet feeding is possible using a manual feed tray and roller 3j.

The process cartridge B contains the electrophotographic photosensitive member and at least one process means. The process means includes, for example, charging means for charging the electrophotographic photosensitive member, developing means for developing the latent image on the electrophotographic photosensitive member, and cleaning means for removing the residual toner from the surface of the electrophotographic photosensitive member.

The process cartridge B of this example contains a photosensitive drum 7, the charging roller 8, the exposure opening 9, and the developing means 10, as shown. The electrophotographic photosensitive drum 7 in the process cartridge B is rotated through a coupling mechanism by the main assembly 13 of the device, as will be described hereinafter. The surface of the photosensitive drum is subjected to uniform charging by the voltage application to the charging roller 8 which is a charging means, and the information light from the optical system 1 is projected onto the photosensitive drum 7 through an exposure opening 9 for a latent image, which is developed by the developing means 10.

In the developing means 10, the toner in a toner accommodating portion 10a is fed out by rotation of a feeding member 10b. A developing roller 10d containing a fixed magnet 10c is rotated so that a toner layer having triboelectric charge provided by a development blade 10e is formed on the surface of the developing roller 10d. The toner is transferred to the photosensitive drum 7 in accordance with the latent image to form the toner image (visualization). The toner image is transferred onto the recording medium 2 by application of the voltage of the opposite polarity from the toner image to the transfer roller 4 provided in the main assembly 13 of the device. The photosensitive drum 7 after transfer is cleaned by the cleaning means 11 so that the residual toner is removed. More particularly, the toner is scraped off by the cleaning blade 11a. The toner thus removed is collected in a residual toner container 11c by a receptor sheet 11b.

The charging roller 8 contacts the photosensitive drum 7 and is driven by the photosensitive drum 7. The cleaning blade 11a contacts the photosensitive drum 7.

The process cartridge B comprises a toner frame 12a having a toner accommodating portion 10a accommodating toner and a developing frame 12b supporting a developing member such as a developing roller 10d, which frames are welded together (ultrasonic welding in this example) to form a developing unit. This developing unit is swingably coupled with a cleaning frame 12c supporting the photosensitive drum 7, the charging roller 8, the cleaning means 11 and the like. The process cartridge B is mounted to a cartridge mounting means of the main assembly 13 of the device by a user in a direction crossing the longitudinal direction of the photosensitive drum 7 (FIGS. 5 and 6). The cleaning frame 12c is provided with mounting guides 12c4 adjacent a bearing 12c2. The bearing 24 (projection 24a) mounted to the cleaning frame 12c is provided with a guide 24c. The bearing 24, projection 24a and guide 24c are integrally molded. The guide 24c is guided by guides 15a 15b when the process cartridge B is mounted.

As cartridge mounting means, as shown in FIG. 5, cartridge mounting guiding members 15 are mounted opposed to each other on left and right sides of a cartridge mounting space of the main assembly 13 (one side in FIG. 5 and the other side in FIG. 6). The guiding members 15 have guide portions 15a and 15c opposed to each other to function as guides when the process cartridge B is pushed into the main assembly. The process cartridge is inserted while bosses or the like, projected from opposite longitudinal ends of the cartridge frame, are guided by the guide portions 15a and 15c. When the process cartridge B is to be mounted to the main assembly 13, a cover 14, which is openable about a shaft 14a, is opened. By closing the openable cover 14, the process cartridge B is correctly mounting to the image forming apparatus A. When the process cartridge B is taken out from the main assembly 13, the openable cover 14 is opened.

When the process cartridge B is mounted to the image forming apparatus A, the cartridge side coupling and the main assembly side coupling are combined in interrelation with the closing operation of the openable cover 14, as will be described hereinafter, so that the photosensitive drum 7 and the like can receive the driving from the main assembly.

{Coupling and Driving Structure}

A description will be provided as to the structure of the coupling means which is a driving force transmission mechanism for transmitting the driving force to the process cartridge B from the main assembly 13 of the image forming apparatus.

Figure 7:
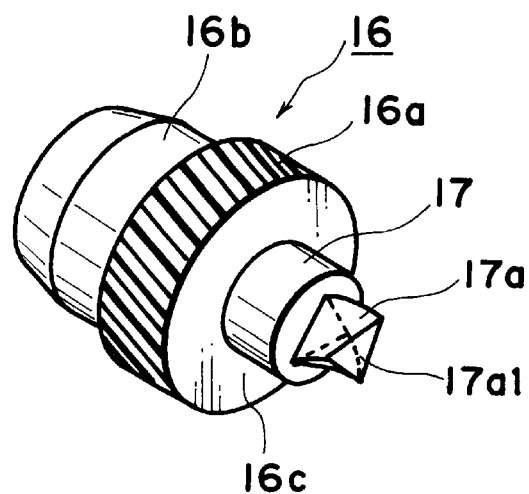
FIG. 7 is a perspective view of a drum flange (driving force transmission part) according to an embodiment of the present invention.
Figure 8:
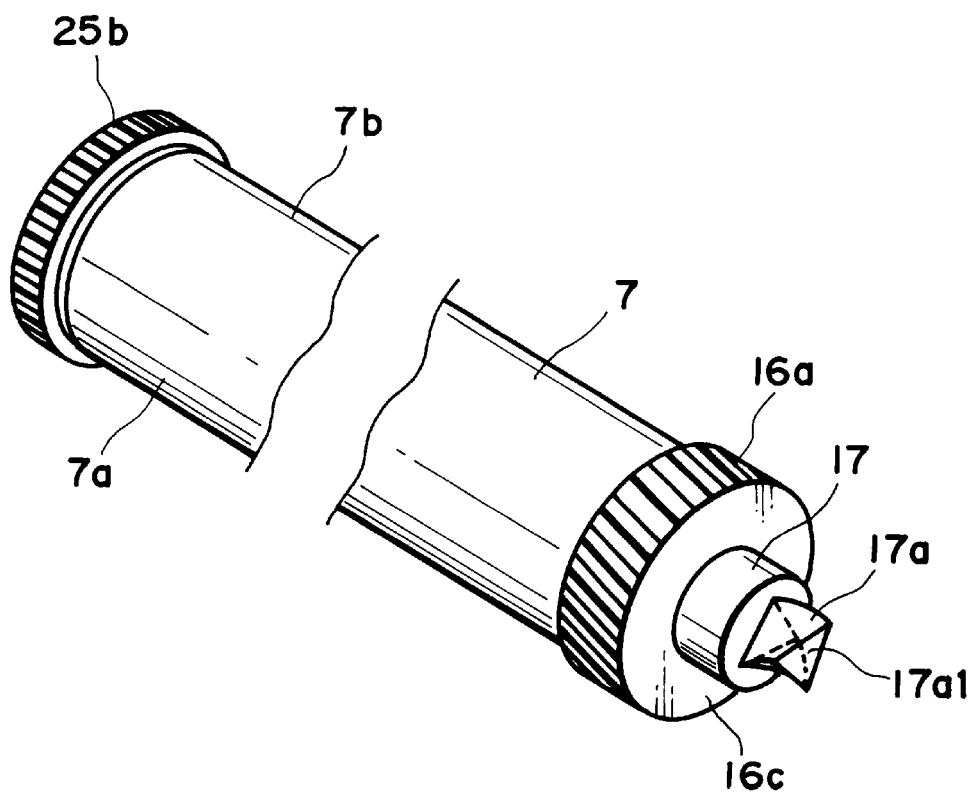
FIG. 8 is a perspective view of a photosensitive drum according to an embodiment of the present invention.
Figure 9:
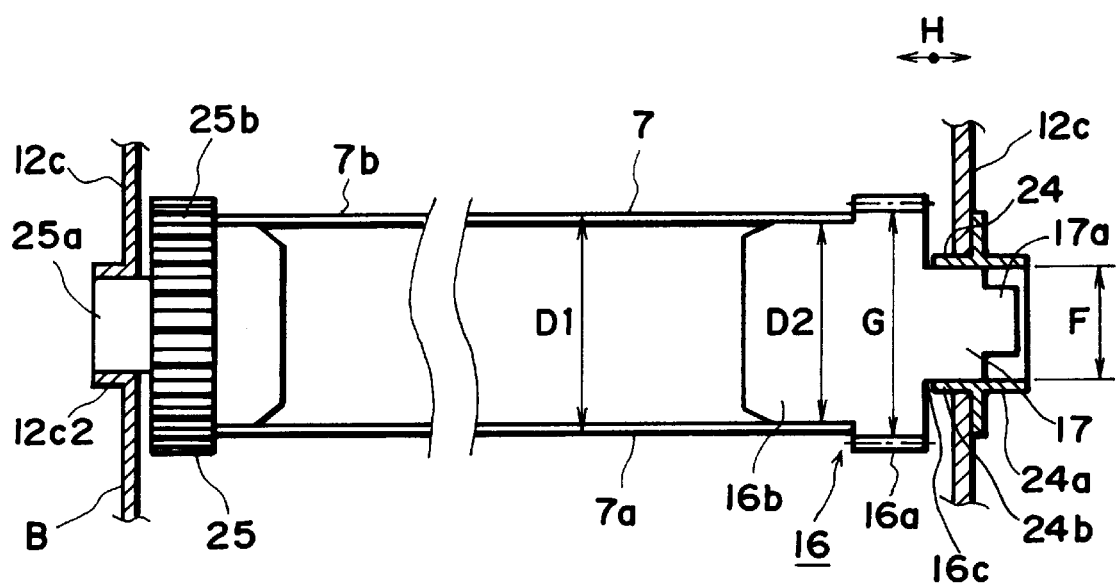
FIG. 9 is a sectional view of a process cartridge side coupling portion according to an embodiment of the present invention.
Figure 10:
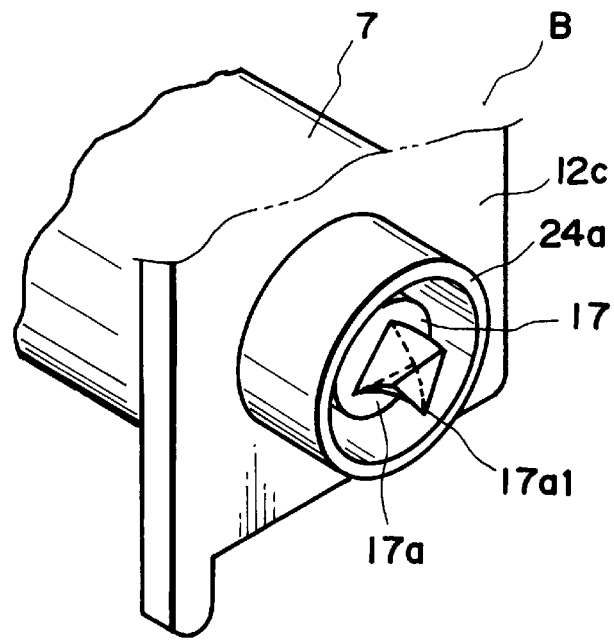
FIG. 10 a perspective view of a coupling portion of a process cartridge according to a present invention of the present invention.
Figure 11:
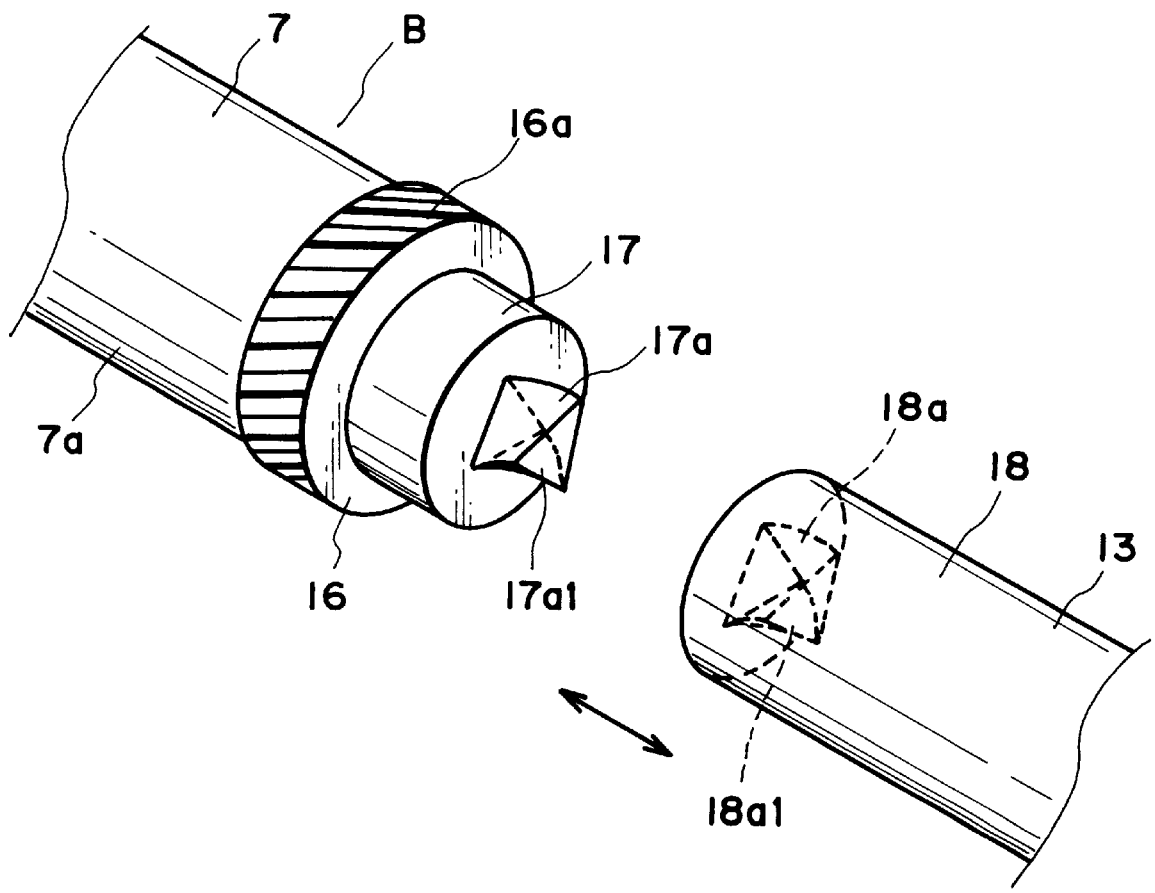
FIG. 11 is a sectional view of a driving system of a main assembly of an electrophotographic image forming apparatus according to an embodiment of the present invention.

FIG. 7 is a perspective view of a drum flange 16 as a driving force transmission part having an integrally formed male shaft 17; FIG. 8 is a partly sectional perspective view of the photosensitive drum 7 having a drum flange 16 mounted thereto; FIG. 9 is a sectional view wherein the photosensitive drum 7 is mounted to the process cartridge B; FIG. 10 is an enlarged perspective view of the male shaft 17 of the process cartridge B of FIG. 9; FIG. 11 shows the relation between the male shaft 17 (provided to the process cartridge B) and the female shaft 18 (provided to the main assembly 13).

As shown in FIG. 8 to FIG. 11, there is provided a cartridge side coupling means at a longitudinal end of the photosensitive drum 7 in the process cartridge B. The coupling means has a male coupling shaft 17 (circular column configuration) mounted to the drum flange 16 fixed an end of the photosensitive drum 7. Here, the end surface of the projection 17a is parallel with the end surface of the projection shaft 17. The male shaft 17 is engaging with a bearing 24 and functions as a drum rotational shaft. In this example, the flange 16, the male coupling shaft 17 and the projection 17a are integrally formed. The flange 16 is provided with a helical gear 16a for transmitting the driving force to the developing roller 10d in the process cartridge. Therefore, as shown in FIG. 7, the drum flange 16 is an integrally molded member having the helical gear 16a, the male shaft 17 and the projection 17a, and is a driving force transmission part having the function of transmitting the driving force.

The projection 17a has a twisted polygonal prism configuration, more particularly, the configuration resulting from twisting a substantially equilateral triangular prism in the rotational direction. The recess 18a has a polygonal shape twisted in the rotational direction of the shaft and therefore is engageable with or complementary with the projection 17a. The recess 18a has a section which is substantially an equilateral triangle. The recess 18a integrally rotates with the gear 34 of the main assembly 13. In the structure of this example, the process cartridge B is mounted to the main assembly 13, and the projection 17a and the recess 18a of the main assembly 13 are engaged. When the rotation force is transmitted from the recess 18a to the projection 17a, the apexes of the projection 17a of the equilateral triangle regularly contact the inside surfaces of the recess 18a, and therefore, the centers thereof are automatically aligned by the rotation, as will be understood from FIGS. 8(a) and (b). Further, the force in the direction of pulling deviating the projection 17 to the recess 18 is produced during rotation due to the twisting directions thereof, so that the end surface 17a1 of the projection contacts to the recess 18a1. Since the photosensitive drum 7 is integral with the projection 17a, the axial position and radial position there are correctly determined in the main assembly 13 of the image forming apparatus.

In this example, as seen from the photosensitive drum 7, the direction of twisting of the projection 17a is opposite from the rotation direction of the photosensitive drum 7 away from the base portion of the projection toward the end portion thereof. The direction of twisting of the recess 18a is opposite therefrom away from the inlet portion of the recess 18a toward the inside. The direction of twisting of the helical gear 16a of the drum flange 16, which will be described hereinafter, is opposite from the twisting direction of the projection 17a.

Figure 18:
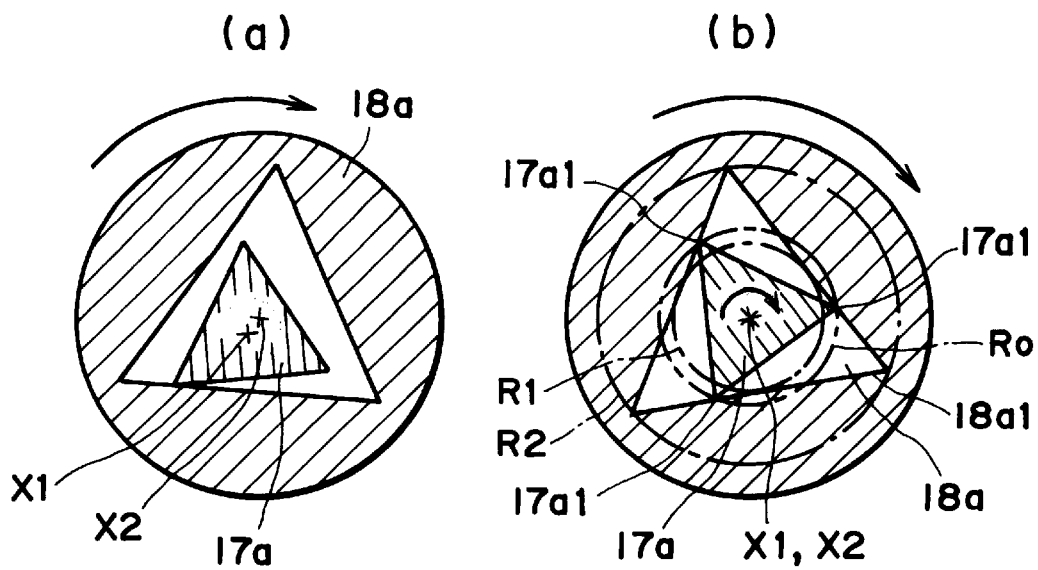
FIGS. 18(*a*) and (*b*) are sectional views of a recess and a coupling projection according to an embodiment of the present invention.

As shown in FIG. 18, the projection 17a and the recess 18a satisfy d1<d0<d2, where d0 is a diameter of a circumscribed circle R0 of the triangular prism of the projection 17a, d1 is a diameter of an inscribed circle R1 of the space in the form of triangle of the recess 18a, and d2 is a diameter of a circumscribed circle R2 of the triangle.

Preferable examples of the numerical ranges of the diameters are as follows:

d0=approximately 3 mm–70 mm d0=approximately 3 mm–70 mm d2=approximately 3 mm–70 mm In these ranges, the sizes are selected so as to satisfy the above-described relations.

In this example, the sizes are as follows:
d0=approximately 16 mm
d1=approximately 9.5 mm
d2=approximately 17.5 mm The degree or amount of the twisting of the projection 17a is approximately 1°–15° per 1 mm of the axial length of the projection 17a in the rotational direction. More particularly, in this example, it is twisted at approximately 7.5° per 1 mm of the axial length.

However, the present invention is not limited to these values.

The position of a cross-section of a three dimensional member is determined by there contact points, theoretically. When the configurations of the projections 17a and the recesses 18a are substantially an equilateral triangle, the apexes of the projection 17a contact the inside surfaces of the equilateral triangle under the same conditions. Therefore, the changes of the contact points and the rotation non-uniformity of the coupling driving due to the load variation during the rotation of the process cartridge B are minimized, thus improving the rotation accuracy of the photosensitive drum 7 (FIG. 18). The male shaft 17 and projection 17a are provided on the drum flange 16 so that when the drum flange 16 is mounted to an end of the photosensitive drum 7, it is aligned with the axis of the photosensitive drum 7. Designated by 16b is an engaging portion which is engaged with an inside surface of the drum cylinder 7a when the drum flange 16 mounted to the photosensitive drum 7. The drum flange 16 is mounted to the photosensitive drum 7 by cramping, bonding or the like. The outer surface of the drum cylinder 7a is coated with a photosensitive material 7b (FIGS. 8 and 9 reference).

A drum flange 25 is fixed to the other end side of the photosensitive drum 7. The drum flange 25 has a drum shaft 25a and spur gear 25b integrally formed therewith.

When the process cartridge B is mounted to the main assembly 13 of the apparatus, the drum shaft 25a (bearing 12c2) is engaged with an U groove 15b (FIG. 5) of the main assembly 13 of the apparatus so as to be correctly positioned, and the spur gear 25b integrally molded with the flange 25 is meshed with a gear (shown) for transmitting the driving force to the transfer roller 4.

Examples of the material of which the drum flange 16 is composed include polyacetal (polyacetal), polycarbonate (polycarbonate) and polyamide (polyamide), polybutylene terephthalate, or another resin material. Other materials are usable.

Around the projection 17a of the male coupling shaft 17 of the process cartridge B, a circular projection 24a coaxial with the male shaft 17 is provided on the cleaning frame 12c (FIGS. 3 and 9). The projection 24a functions to protect the coupling projection 17a when, for example, the process cartridge B is mounted or demounted relative to the main assembly, so that the coupling projection 17a is prevented from being damaged or deformed by external force or the like. Thus, vibration or wobbles during the coupling driving operation due to damage to the projection 17a, can be avoided.

The projection 24a also can function as a guiding member for the mounting and demounting of the process cartridge B relative to the main assembly 13 of the image forming apparatus. More particularly, when the process cartridge B is mounted to the main assembly A, the projection 24a contacts the main assembly side guide portion 15c and functions to guide the process cartridge B to the mounting position of the apparatus, thus facilitating the mounting-and-demounting of the process cartridge B relative to the main assembly 13.

When the process cartridge B is mounted to the mounting position, the projection 24a is supported by the recess 15d provided on the guide portion 15c. When the male coupling shaft 17 and female shaft 18 are aligned by the driving for the image formation, the projection 24a is raised slightly from the U groove 15d (approximately 0.3 mm–1.0 mm), and the gap between the projection 24a and the main assembly guide portion 15a (recess 15d) is smaller than the gap between the coupling projection 17a and the recess 18a in the radial direction. Therefore, the engagement between the coupling projection 17a and the recess 18a is permitted while the process cartridge B is mounted to the main assembly 13. A recess 18a is provided opposed to the U groove 15d. The configuration of the projection 24a is not limited to being circular as in this example, but may be, for example, any arcuate configuration, if it is guided by the guide portion 15c, and is supported by the U groove 15d. In this example, the bearing 24 for supporting rotatably the shaft portion 17 and the circular projection 24a are integrally molded, and is fixed to the cleaning frame 12c by screws (FIG. 9), but the bearing 24 and the projection 24a may be separate members.

In this example, the drum shaft 25a is engaged with the bearing portion 12c2 provided in the cleaning frame 12c (FIG. 49), and the male shaft 17 is engaged to the inside surface of the bearing 24 provided in the cleaning frame 12c, and with this state, the photosensitive drum 7 is mounted to the cleaning frame 12c of the process cartridge B. Therefore, the photosensitive drum 7 is rotated about the shaft 17 and 25a. In this example, the photosensitive drum 7 is mounted to the cleaning frame 12c in the manner that the movement thereof in the axial direction is possible. This is done in consideration of the mounting tolerance. This structure is not inevitable, and the photosensitive drum 7 may be non-movable in the slide direction.

Among the photosensitive drum 7, the flange 16 and the male coupling shaft 17, there is a relationship as shown in FIG. 9. More particularly, the outer diameter of the photosensitive drum 7 (outer diameter of the cylinder 7a)=D1, the helical gear dedendum circle diameter=G, the diameter of the photosensitive drum bearing (outer diameter of the shaft portion 17, the inner diameter of the bearing 24)=F, the diameter=C of the circumscribed circle of the coupling projection, and the engaging portion diameter(drum inner diameter)=D2 of the drum flange 16 relative to the photosensitive drum 7, satisfy D1>F≧C and G≧D2.

The expression D1>F is effective to reduce the torque required by the sliding load at the bearing. The expression F≧C is effective to simplify the mold structure when the flange portion is molded since the undercut portion is not required which otherwise is required in the mold division of the mold in the direction of the arrow H in the figure.

Furthermore, because the expression G>D2 satisfied, the mold configuration of the gear portion is on the left side mold in FIG. 6, and therefore, the right side mold structure, which is complicated due to the provision of the coupling configuration, is simplified, and therefore, the durability of the mold is improved.

The dimensional relations apply in the case that the relation between the male shaft 17 and the female shaft 18 are reversed, that is, in the case that the photosensitive drum is provided with the recess 18a while the main assembly side of the apparatus is provided with the projection 17a (the diameter of the circumscribed circle of the polygonal of the recess 18a is C). The same advantages are provided in such a case, too.

Examples of the numerical ranges of them are as follows:

D1=approximately 10 mm–60 mm
G=approximately 10 mm–70 mm
F=approximately 5 mm–70 mm
C=approximately 3 mm–70 mm
D2=approximately 9 mm–59 mm.

The sizes may be selected within these ranges so as to satisfy the above-described relations.

In this example, sizes are as follows:

D1=approximately 30 mm
G=approximately 31 mm
F=approximately 16 mm
C=approximately 14 mm.

However, the present invention is not limited to these sizes.

Figure 12:
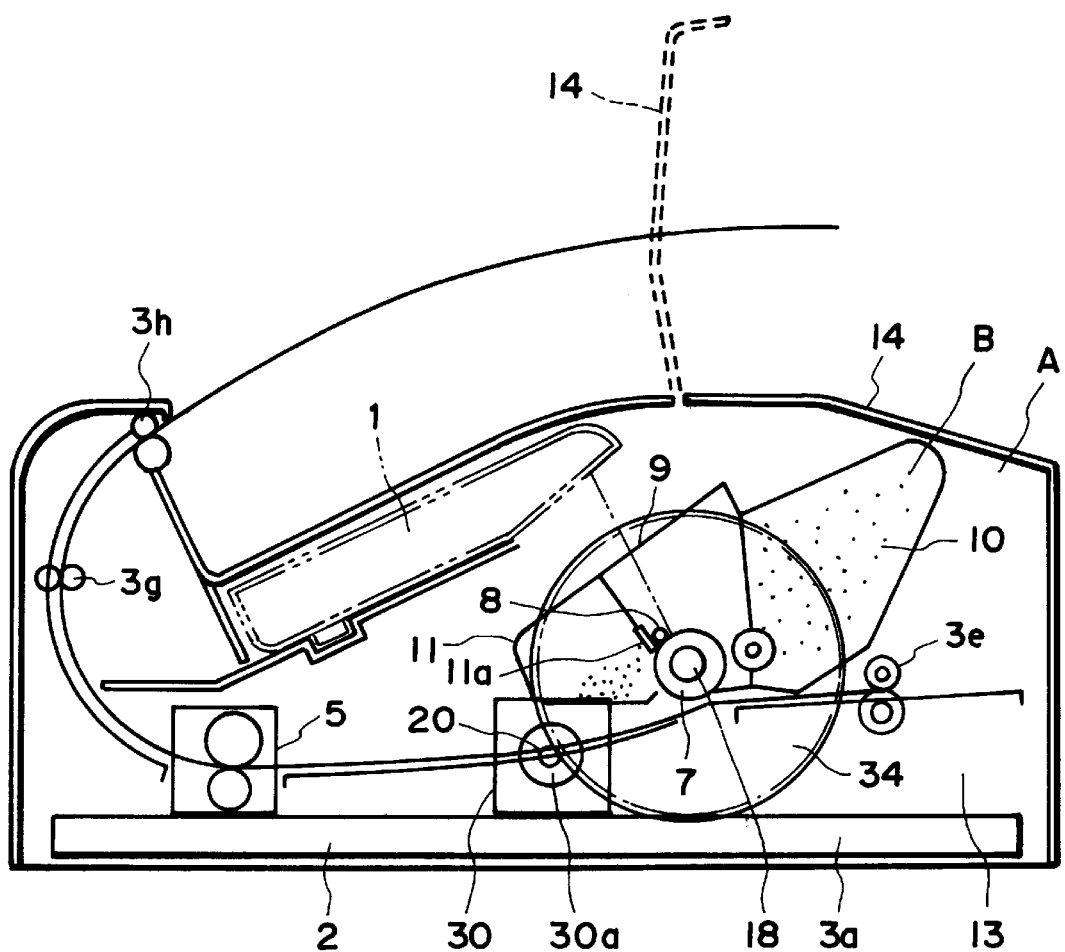
FIG. 12 is a sectional view of a driving system of a main assembly of an electrophotographic image forming apparatus according to an embodiment of the present invention.
Figure 13:
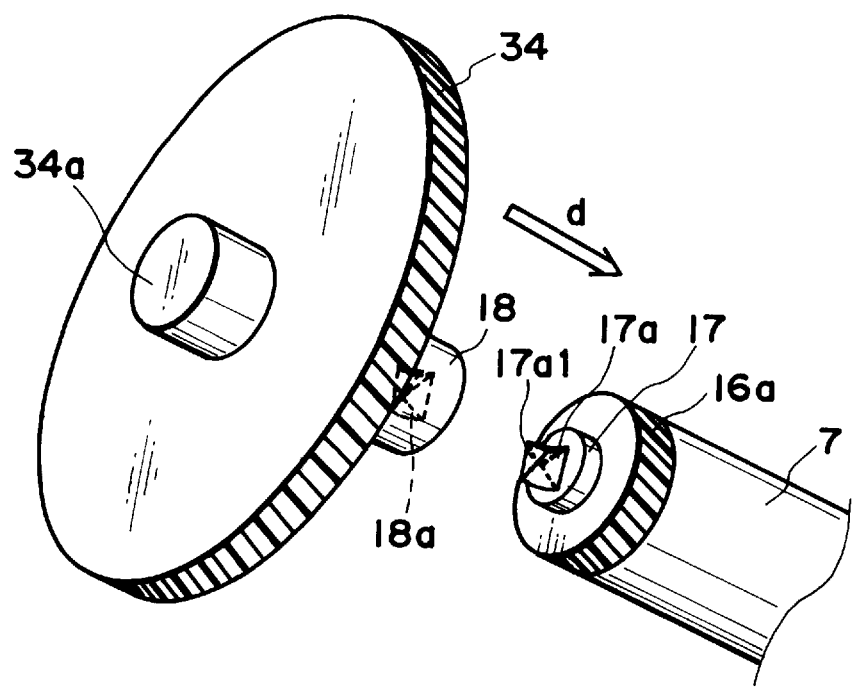
FIG. 13 is a perspective view of a coupling of a main assembly of the device and a coupling of the process cartridge, according to an embodiment of the present invention.
Figure 14:
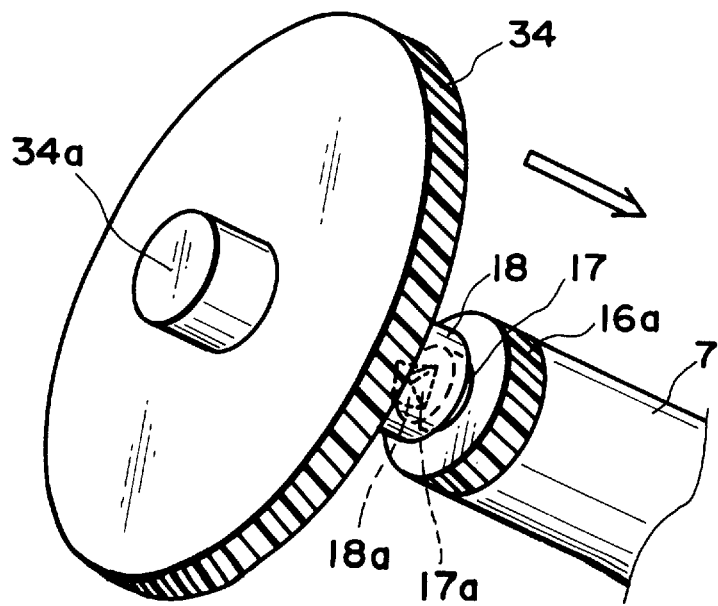
FIG. 14 is a perspective view of a coupling of a main assembly of a device and a coupling of a process cartridge according to an embodiment of the present invention.

On the other hand, the main assembly 13 of the image forming apparatus is provided with main assembly coupling means. The main assembly coupling means includes a female coupling shaft 18 (circular column configuration) at a position in alignment with the photosensitive drum rotation axis when the process cartridge B is inserted. The female coupling shaft 18 is a driving shaft integral with the large diameter gear 34 for transmitting the driving force from the motor 30 to the photosensitive drum 7, as shown in FIG. 12. The female shaft 18 is projected from a lateral edge of the gear 34 at a rotation center of the gear 34 (FIGS. 13, 14). In this example, the large diameter gear 34 and the female coupling shaft 18 are integrally molded.

The gear 34 in the main assembly side is a helical gear. The tooth thereof has such an inclination angle that a thrust is produced in the direction of moving the female shaft 18 toward the male shaft 17 when the driving force is transmitted thereto from the helical gear 20 fixed to the shaft 30a of the motor 30. Therefore, when the motor 30 is driven upon image formation, the thrust is effective to move the female shaft 18 to the male shaft 17 to establish firm coupling between the recess 18a and the projection 17a. The recess 18a is provided at the rotation center of the female shaft 18 at an end of the female shaft 18.

In the embodiment, the driving force is transmitted directly from the gear 20 fixed to the motor shaft 30a to the gear 34, a gear train may be used for deceleration and driving transmission, or the use may be made of a belt and pulley, a pair of friction rollers, or a combination of a timing belt and a pulley.

Figure 15:
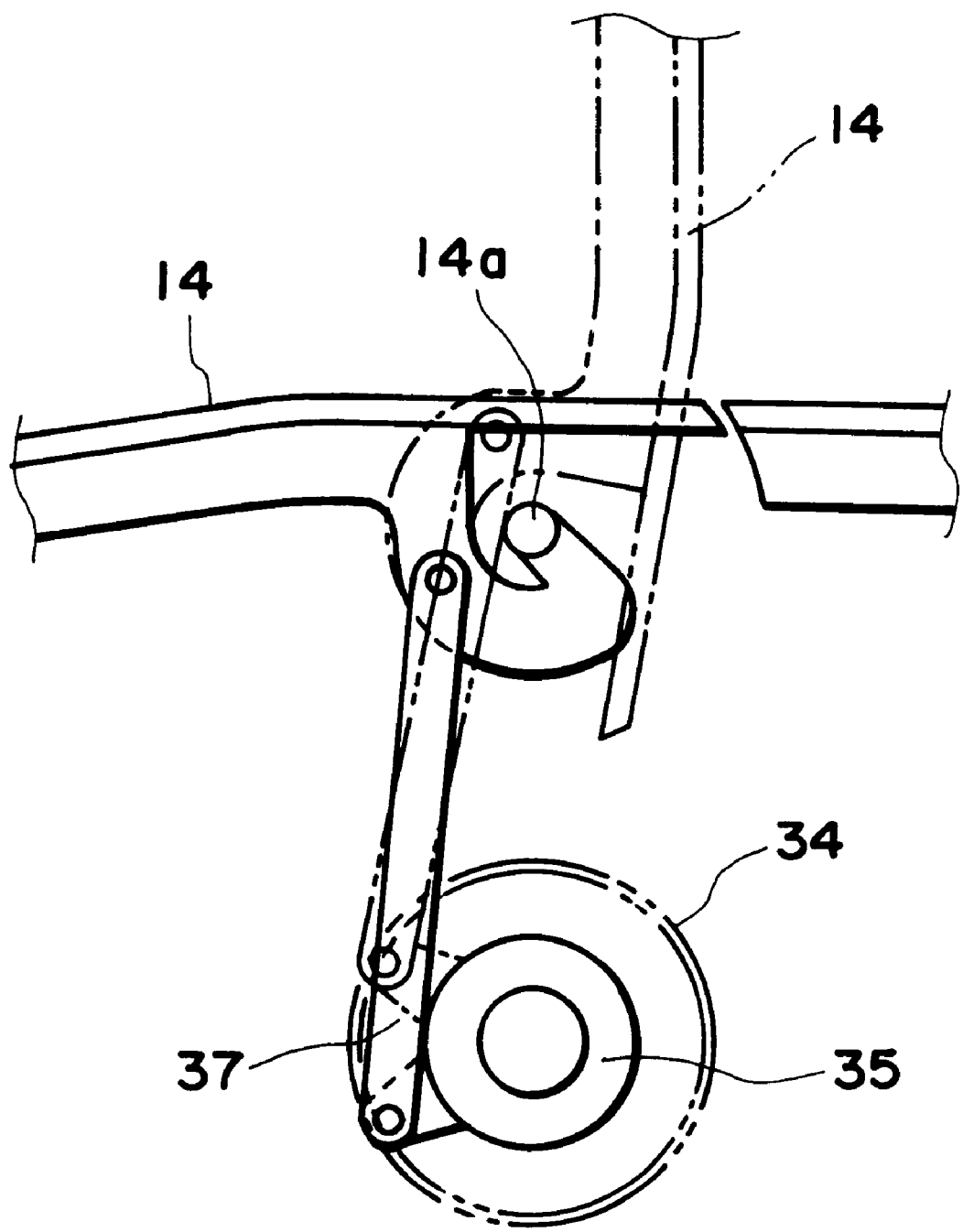
FIG. 15 is a sectional view of a structure of a coupling portion and a cover of the main assembly of the device according to an embodiment of the present invention.
Figure 16:
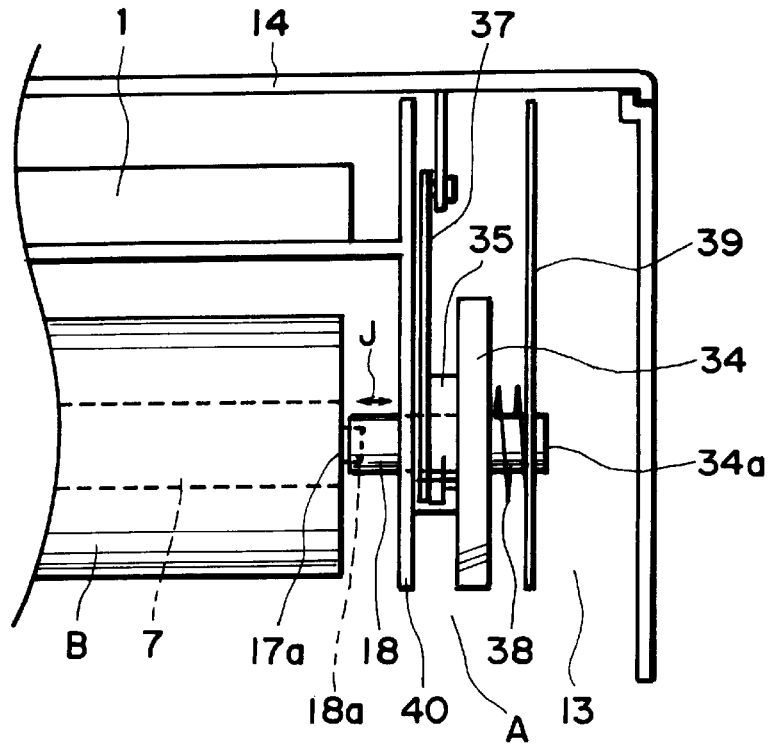
FIG. 16 is a side view of a structure of a female coupling shaft according to an embodiment of the present invention.
Figure 17:
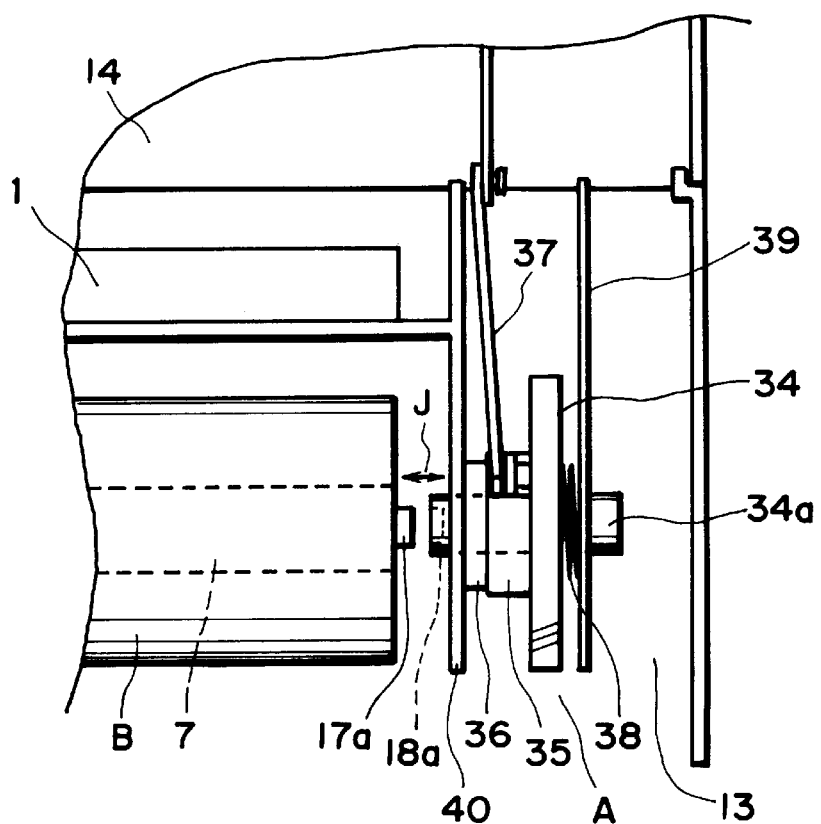
FIG. 17 is a side view of a structure of a female coupling shaft upon process cartridge mounting-and-demounting relative to the main assembly according to an embodiment of the present invention.

Referring to FIG. 15 to FIG. 17, a description will be provided as to the structure for engaging the recess 18a and projection 17a in interrelation with the closing operation of the openable cover 14.

FIG. 15 is a view as seen in a direction of the axis of the photosensitive drum 7, wherein an outer cam 35 and an inner cam 36 (FIG. 17 reference) are disposed between the gear 34 and the photosensitive drum 7 (unshown), and the cover 14 of the image forming apparatus and the outer cam 35 are connected by a rod 37, thus constituting a moving means. Designated by 40 is a side plate provided in the main assembly 13. Referring to FIGS. 16 and 17, designated by 34a is a shaft supporting portion for supporting the gear 34 on the side plate 39.

FIG. 16 is a view as seen from the right side. When the cover 14 is closed, the rod 37 and the outer cam 35 and so on take the position shown in this figure, and they are coupled by the coupling projection 17a and the recess 18a to permit driving force transmission from the gear 34 to the photosensitive drum 7. When the cover 14 is opened, the cam 35 is pulled through the rod 37, as shown in FIG. 17, and therefore, the cam 35 is rotated to be contacted to the inner cam 36, thus moving the gear 34 away from the photosensitive drum 7. At this time, the gear 34 and the female coupling shaft 18 are pushed by the outer cam 35 to push the spring 38 mounted between itself and the fixing plate 39 and moves in the same direction, so that the recess 18a becomes spaced from the projection 17a to release the coupling, by which the cartridge B demounting is enabled. When the cover 14 is closed, the cam 35 rotates in the opposite direction and is pushed by the spring 38 so that the gear 34 is reset to the position shown in FIG. 16 to enable the driving transmission. With this structure, the mounting-and-demounting of the cartridge B and the drive transmission are disabled and enabled in response to the opening and closing of the cover 14.

In this example, the cover 14 is opened and closed when the process cartridge B is mounted to or demounted from the main assembly of the apparatus. In interrelation with the opening and closing of the cover 14, the recess 18a moves in a horizontal direction (arrow j direction). When the process cartridge B is mounted or demounted relative to the main assembly, the coupling (between 17a and 18a) between process cartridge B and the main assembly 13 of the apparatus is assuredly disengaged. Therefore, the mounting-and-demounting of the process cartridge B relative to the main assembly 13 can be smoothly carried out. In this example, the recess 18a is urged toward the process cartridge B by the spring 38. Therefore, even if the projection 17a and the recess 18a are not aligned, and therefore abutment occurs therebetween, and they are not engaged, they are engaged instantaneously upon the rotation of the recess 18a.

A description will be provided as to the configurations of the projection 17a and the recess 18a which are engaging portion of the coupling means.

The female coupling shaft 18 provided in the main assembly 13 is movable toward the rotational shaft, as described hereinbefore, but is not movable in the radial direction. The process cartridge B is mounted in the main assembly 13 of the apparatus such that it is movable in the longitudinal direction and radial direction of the photosensitive drum 7.

More particularly, when the process cartridge B is mounted in the main assembly 13 of the device, a portion of the drum shaft 25a (bearing 12c2) (FIG. 4 and 9) formed on the flange 25 mounted adjacent the other longitudinal end of the photosensitive drum 7 is received by the U groove 15b (FIG. 5) of the main assembly 13 and is engaged therewith without a gap, so that it is correctly positioned, and the spur gear 25b, integrally molded with the flange 25, is meshed with a gear (not shown) for transmitting the driving force to the transfer roller 4. On the other hand, at the longitudinal end of the photosensitive drum 7 (driving side), the projection 24a of the cleaning frame 12c is supported by the recess 15d of the main assembly 13. By closing the cover 14, the recess 18a is moved in a horizontal direction and is received by the projection 17a (FIG. 8(a)).

The positioning and driving transmission at the driving side (coupling side) are as follows.

When the main assembly driving motor 30 is rotated, the female coupling shaft 18 is moved toward the male coupling shaft 17 (arrow d in FIG. 13), and they are engaged when the phases of the projection 17a and the recess 18a are matched (in this example, since the projection 17a and recess 18a have substantially equilateral triangular configurations, the phases thereof match at every 120°). Then, the rotation force is transmitted from the main assembly 13 of the apparatus to the process cartridge B (from the state of FIG. 17 to the state of FIG. 16).

Since the sizes of the equilateral triangles are different, more particularly, the size of the triangle of the recess 18*a* is larger than that of the projection 17*a* (as shown in FIG. 8(*a*)), the projection 17*a* is smoothly engaged into the recess 18*a* with a gap therebetween. The accuracy of the positioning between the male coupling shaft 17 and female coupling shaft 18 may be rough at the time of engaging action.

In this example, the projection length of the circular projection 24*a* is larger than that of the projection 17*a* (FIG. 9). Therefore, when the projection 17*a* and the recess 18*a* are engaged, the inside surface of the circular projection 24*a* is engaged with the outer peripheral surface of the female coupling shaft 18 to guide the engagement therebetween.

When the female coupling shaft 18 is rotated with the projection 17*a* engaged with the recess 18*a* for image formation, the inside surfaces 18*a*1 of the recess 18*a* are engaged to the apex lines 17*a*1 of the equilateral triangular prism of the projection 17*a* (as shown in FIG. 8) to permit the transmission of the driving force. At this time, the male shaft 17 instantaneously moves so that the inside surfaces 18*a*1 of the recess 18*a* contact the edge lines 17*a*1 of the projection 17*a* at regular positions (equidistantly) (from the state of FIG. 8(*a*) to the state of FIG. 8(*b*)). Since the projection 17*a* and the recess 18*a* are both substantially equilateral triangles, the male shaft 17 and the female shaft 18 are brought into the coaxial state with each other with uniform contact forces. Immediately after the projection 17*a* is brought into engagement with the recess 18*a*, the rotation center of the projection 17*a* is not aligned with the rotation center X2 of the recess 18*a* (FIG. 8(*a*)). However, when the recess 18*a* starts to rotate, and it contacts the edge line 17*a*1 of the projection 17*a* at 3 points (lines), the rotation centers X1 and X2 are substantially aligned.

Thus, the coupling shafts 17 and 18 are automatically axis aligned by the rotation of the motor 30 (self-alignment). Furthermore, by the driving force transmission to the photosensitive drum 7, the process cartridge B is rotated, by which the abutment portion 12*c*1 provided on the top surface of the cleaning frame 12*c* of the process cartridge B (FIGS. 3 and 4) abuts to the abutment portion 13*a* (FIG. 1) fixed to the main assembly 13 of the image forming apparatus, so that the process cartridge B is precisely positioned to the main assembly A of the image forming apparatus.

When the process cartridge is not driven (non-image formation), a gap is provided between the projection 17*a* and recess 18*a* in the rotation radius direction (radial direction), and the engagement between the couplings and the mounting and demounting of the process cartridge relative to the main assembly are made easier. Additionally, the contact force at the coupling engagement portion is stabilized, so that wobble and vibration at this position can be suppressed.

In this example, the coupling projection and recess have substantially equilateral triangular configurations, but similar advantage can be provided if the configuration is an equilateral polygonal. The use of an equilateral polygonal configuration is preferable since the positioning is correct, but any polygonal configurations are usable if engagement is possible and pulling engagement is possible.

When the comparison is made between the coupling projection and recess, the projection is easily damaged, and the strength thereof is less than the recess. In this example, the coupling projection is provided in the process cartridge B, which is exchangeable, and the coupling recess is provided in the main assembly 13 which is required to have a higher strength.

The features of the process cartridge B of embodiment the summarized as follows. The process cartridge B of this example is detachably mountable relative to a main assembly of an electrophotographic image forming apparatus A comprising a motor 30, a main assembly gear 34 for receiving the driving force from the motor, and a twisted polygonal hole 18*a* integrally rotatable with the main assembly gear, the hole being formed at the center of the main assembly gear, the electrophotographic image forming apparatus A being capable of forming an image on the recording medium 2. The process cartridge comprises the electrophotographic photosensitive drum 7, the process means actable on the electrophotographic photosensitive drum (charging roller 8, developing roller 10, cleaning blade 11*a*), and a twisted polygonal prism projection (projection 17*a*) engageable with the twisted polygonal hole of the main assembly wherein, the projection is provided at the end of the electrophotographic photosensitive drum. The process cartridge B is mounted to the main assembly 13 of the main assembly, and the polygonal prism projection 17*a* is engaged with the recess of the main assembly, and when the gear 34 is rotated, the rotational driving force is transmitted to the photosensitive drum.

The projection 17*a* is projected from the end of the shaft portion 17 projected outwardly in the longitudinal direction of the drum from the rotation center position of the drum 7. The shaft portion functions to rotatably support the drum 7 on the cartridge frame 12*c*.

The shaft portion 17 is provided at the central portion of the helical gear 16*a*, and at the opposite end from the helical gear 16*a* side, an engaging portion 16*b* for engagement with the inside surface of the electrophotographic photosensitive drum 7 is provided. The projection 17*a*, the shaft portion 17, the helical gear 16*a*, and the engaging portion 16*b* are integrally molded of a resin material material. The helical gear functions to transmit the rotation force to the developing roller 10*a* as the process means.

Furthermore, there is provided a circular outer wall 24*a* enclosing the polygonal prism projection 17*a*, or an arcuate configuration outer wall along a part of the polygonal prism projection. The outer wall 24*a* functions as a guide when the engagement between the hole 18*a* and the projection 17*a* occurs by relative movement therebetween.

The outer diameter D1 of the electrophotographic photosensitive drum 7, the outer diameter F of the shaft portion 17, and the diameter C of the circumscribed circle of the polygonal prism projection 17*a*, satisfy $D1 > F \geq C$.

The outer diameter F of the shaft portion 17, the diameter C of the circumscribed circle of the polygonal prism projection 17*a*, the dedendum diameter G of the gear 16*a* of the electrophotographic photosensitive drum 7, and the inner diameter D2 of the electrophotographic photosensitive drum 7, satisfy $G > D2$ and $G > F \geq C$.

The outer diameter D1 of the electrophotographic photosensitive drum 7, and the dedendum circle diameter L of the main assembly gear 34, L is preferably not less than approximately 1.0 times D1 and not more than 5.0 times D1. The relation is properly selected by one skilled in the art in consideration of the space of the main assembly of the device and the desired image quality. The dimensions are not limiting. In this example, it is approximately 3 times.

The module of the main assembly gear 34 is approximately 0.4–0.7. The dedendum diameter L of the main assembly gear 34 of the device is approximately 30 mm–150 mm, and the number of teeth of the main assembly gear 34 is approximately 40 teeth to 400 teeth. They are properly selected by one skilled in the art in consideration of the space in the main assembly and the desired image quality. The figures are not limiting. In this example, the module of the gear 34 is approximately 0.5, and L is approximately 100 mm, and the number of the teeth of the gear 34 is 200.

The positioning of the process cartridge B relative to the main assembly 13 during the image formation (driving transmission) is summarized as follows.

First, the process cartridge B is positioned by the bearing 12 being snugly fitted in the U groove 15d during the non-image formation. On the other hand, the projection 24a is simply supported by a receptor portion 15c. During image formation, the process cartridge B is positioned by the projection 17a being attracted by the recess 18a of the main assembly 13 and being engaged with the projection 17a. Namely, during image formation, the process cartridge B is positioned by the U groove 15b at one longitudinal end, and by the recess 18a at the other end. In this example, the photosensitive drum 7 is movable in the longitudinal direction (approximately 0.1 mm–1.0 mm). When the projection 17a is attracted to the recess 18a, the end portion 16c of the drum flange 16 (FIGS. 7 and 8 and FIG. 9) is brought into contact with the end portion 24b of the bearing 24. The process cartridge B, which is mounted movably relative to the main assembly side plate or mounting guides 15a and 15c with play of approximately 0.1–3 mm) in consideration of assembly tolerance, is pulled toward the photosensitive drum 7 in the longitudinal direction and in the radial direction, thus moving in an inclined upward direction. In the case the end portion 16c is in contact with the end portion 24b at the beginning, or when the photosensitive drum 7 does not have play in the longitudinal direction, the process cartridge B is pulled to the photosensitive drum 7 immediately in its longitudinal direction and in the radial direction, thus moving in an upward inclined direction.

During the image formation operation, the process cartridge B receives the rotation force in the same direction as the rotation direction of the photosensitive drum 7. By this rotation force, the contact portion 12c1 contacts to the fixed portion 13a.

Accordingly, the process cartridge B is correctly positioned relative to the main assembly 13 of the apparatus in both the longitudinal direction and the radial direction during the image formation operation.

Figure 21:
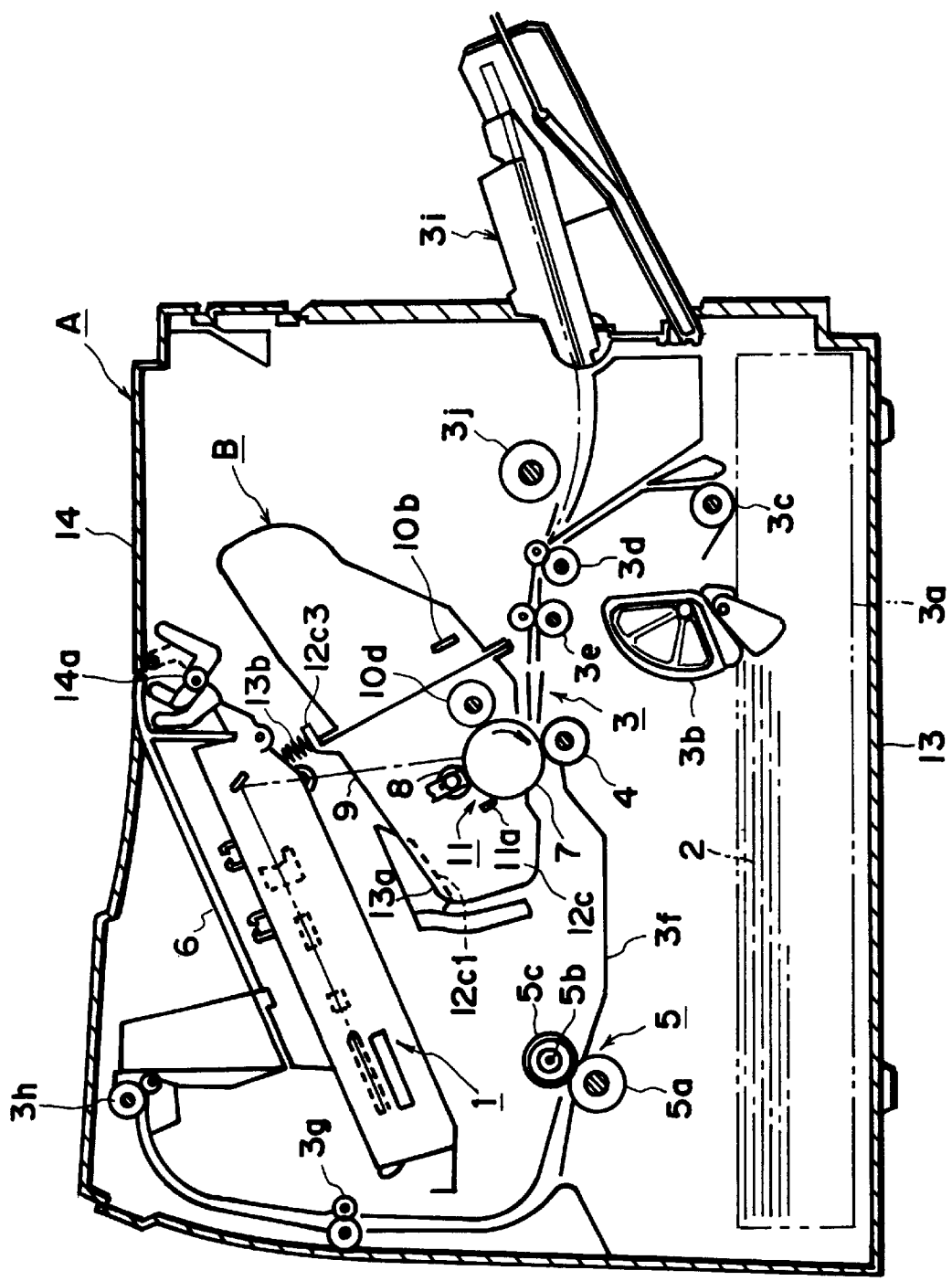
FIG. 21 is a sectional view of an electrophotographic image forming apparatus according to an embodiment of the present invention.

When the process cartridge B is pushed by an elastic member as in the FIG. 21 example, the process cartridge B may not move in the longitudinal direction of the drum 7, depending on the strength of the elastic force provided by the elastic member. Even in that case, when the drive transmission starts, the process cartridge B moves in the radial direction (substantially upward) so that it is correctly positioned relative to the main assembly. In this case, even if the drum 7 does not involve play in the longitudinal direction, the process cartridge B is correctly positioned relative to the main assembly.

Referring back to FIG. 18, it will be understood that a description of the coupling mechanism is summarized as follows. The driving rotatable member 18a for receiving a driving force from the motor is provided with a twisted recess or projection having a non-circular cross-section and is substantially coaxial with a rotation axis X2 of the drive rotatable member 18a. The member to be driven or the image bearing member is provided with a twisted projection or recess 17a provided at a longitudinal end of the image bearing member, having a non-circular cross-section and substantially coaxial with a rotation axis of the image bearing member, wherein the projection or recess of the image bearing member 17a has such a dimension and configuration that it can take a first relative rotational position (FIG. 18(a), for example) with respect to the recess or projection of the driving rotatable member 18a in which relative rotational movement therebetween is permitted, and a second relative rotational position (FIG. 18(b), for example) with respect to the recess or projection of the driving rotatable member 18a in which relative rotational movement is prevented in one rotational direction (indicated by arrows in FIG. 18(b)), while the rotation axis X2 of the driving rotatable member 18a and the rotation axis X1 of the image bearing member are substantially aligned with each other.

It is preferable that the recess or projection of the driving rotatable member and the projection or recess of the image bearing member contact substantially at three twisted points (lines). It is further preferable that the three points constitute a substantially equilateral triangle.

Embodiment 2

Figure 19:
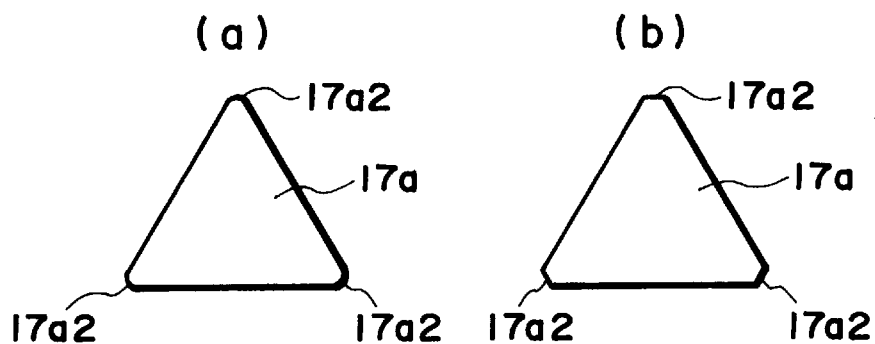
FIGS. 19(a) and (b) are views of a coupling projection according to a one embodiment of the present invention.

Referring to FIG. 19, a description will be provided as to embodiment 2 of the projection 17a of the male coupling shaft 17. The fundamental structures of the process cartridge and the image forming apparatus are the same as in embodiment 1, and therefore, the same reference numerals as in embodiment 1 are assigned to the elements having the corresponding functions, and detailed descriptions thereof are omitted for simplicity.

The coupling projection 17a of FIG. 19 is different from that in embodiment 1 in that the apexes 17a2 of the substantially equilateral polygonal prism shape of the projection (it is substantially equilateral triangle shape in FIG. 19) are beveled. The beveling includes rounding as shown in FIG. 19(a) and straight cutting as shown in FIG. 19(b).

With this structure, the collapse of the apexes of the projection 17a during handling of the process cartridge B can be avoided. During the driving, the deformation and deflection of the apexes due to insufficient strength can be avoided. Thus, the decrease of the alignment accuracy between the male shaft 17 and the female shaft 18 can be prevented, and the wobble and vibration at the coupling portion can be avoided.

In FIG. 19(a), as will be understood when this configuration is introduced in the projection 17a of FIG. 18(b), the portions contacting the inner surface of the recess are not the outermost points of the configuration of FIG. 19(a), but are portions slightly deviated therefrom (at each apex portion). From the standpoint of axis alignment, it is preferable that such deviated three contact points constitute a substantially equilateral triangle.

Similarly, in FIG. 19(b), it is preferable that the three points constitute a substantially equilateral triangle.

For the same reason, in the polygonal projection (polygonal recess) examples, it is preferable that the projection and recess contact at three points which constitute a substantially equilateral triangle, from the standpoint of axis alignment.

In the case of FIG. 19(a), each contact point (actually a twisted line) in the cross-section may have a certain width. In such a case, the centers or one side ends of the widths are deemed as the points to constitute the triangle.

Embodiment 3

Figure 20:
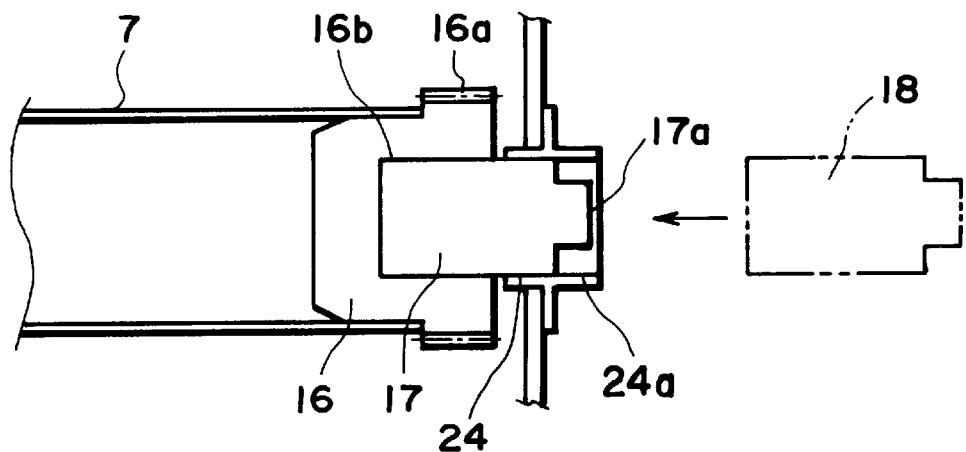
FIG. 20 is a sectional view of a process cartridge side coupling portion according to an embodiment of the present invention.

Referring to FIG. 20, a description will be provided as to embodiment 3 of the projection of the male coupling shaft 17. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In embodiment 1, the flange 16 of the photosensitive drum 7 and the male coupling shaft 17 are integral, but they may be separate members, which are incorporated in the process cartridge B, respectively.

When the male coupling shaft 17 and the flange 16 are separate members, as in this example, the male coupling shaft 17 can be mounted into the engaging portion 16b of the flange 16 by press-fitting or the like after the photosensitive drum 7 with the flange 16 is incorporated in the frame 12c, so that the photosensitive drum 7 may not be assembled into the frame 12c in an inclined direction.

Embodiment 4

Referring to FIG. 21, a description will be provided as to embodiment 4 having a different positioning structure of the process cartridge to the main assembly of the image forming apparatus, using the coupling structure of the present invention. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

As shown in FIG. 21, the main assembly 13 of the image forming apparatus is provided with an elastic member 13b for urging the process cartridge B in the rotation direction of the photosensitive drum 7. The elastic member 13b contacts the contact portion 12c3 of the cleaning frame 12c of the process cartridge B while the process cartridge B is in the main assembly in place, and it applies the rotation force in the same direction as the rotation direction of the photosensitive drum 7 to the process cartridge B. The process cartridge B receiving the rotation force tends to rotate in the rotation direction of the photosensitive drum 7 (clockwise direction in FIG. 21), but is stopped by the abutment between the abutment portion 12c1 of the frame 12c and the abutment portion 13a of the main assembly. This is effective to prevent vibration, in the rotation direction, of the process cartridge B urged in the rotation direction of the photosensitive drum 7 by the coupling driving force, due to the internal load variation or the like. The contact portion 12c3 is provided at each of two positions, namely, adjacent one end side and other end side in the longitudinal direction of the photosensitive drum 7 on the top surface of the cleaning frame 12c (FIGS. 3 and 4).

Embodiment 5

Figure 22:
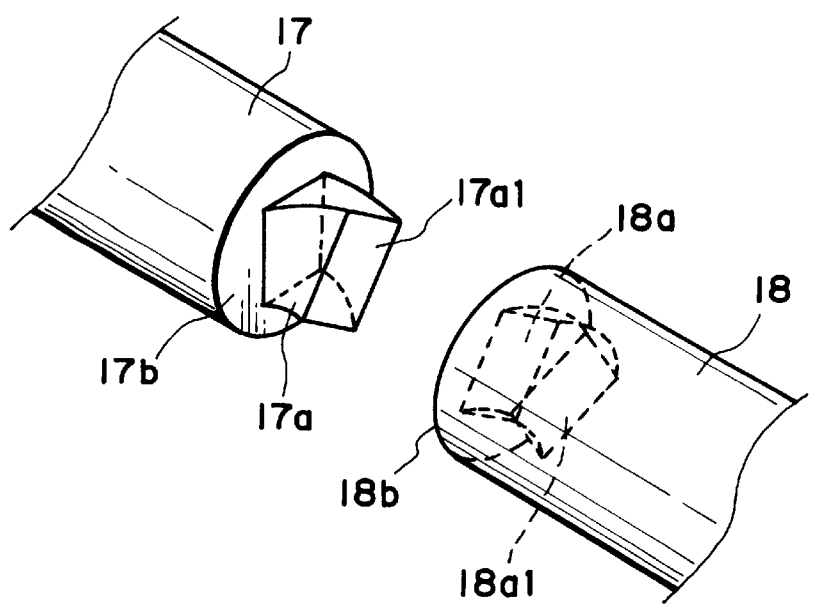
FIG. 22 is a perspective view of a recess and a coupling projection according to an embodiment of the present invention.

Referring to FIG. 22, another embodiment of the coupling structure will be described. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In this example, as shown in FIG. 22, the projection 17a of the male coupling shaft 17 and the recess 18a of the female shaft 18 have a substantially rectangular configuration section which is twisted in the rotation direction of the shaft. Similarly to embodiment 1, the durable coupling recess 18a is provided in the main assembly 13 of the image forming apparatus. With this structure, when the driving force is transmitted while the coupling is in engagement, the force is produced so that the female coupling shaft 18 pulls the male shaft 17 in the axial direction due to the twisting direction thereof, by which the projection end surface 17a1 of the male coupling shaft 17 is abutted to the recess bottom surface 18a1 (or, the male shaft end surface 17b is abutted to the end surface 18b of the female shaft).

Since the position of the process cartridge B is constant in the direction of the coupling shaft in the main assembly A of the image forming apparatus during the driving operation, the vibration of the process cartridge can be suppressed.

In this example, the cross-sectional configurations of the projection 17a of the coupling shaft and the recess 18a have a substantially rectangular configuration, but another polygonal prism shape is usable if the engagement is established when the coupling recess is rotated.

When the process cartridge B is demounted from the main assembly, the motor 30 may be rotated in the opposite direction, and the coupling engagement is automatically released due to the thrust between the gear 33 and the helical gear 34. In this case, there is no need to use the coupling release mechanism as in embodiment 1.

Embodiment 6

Figure 23:
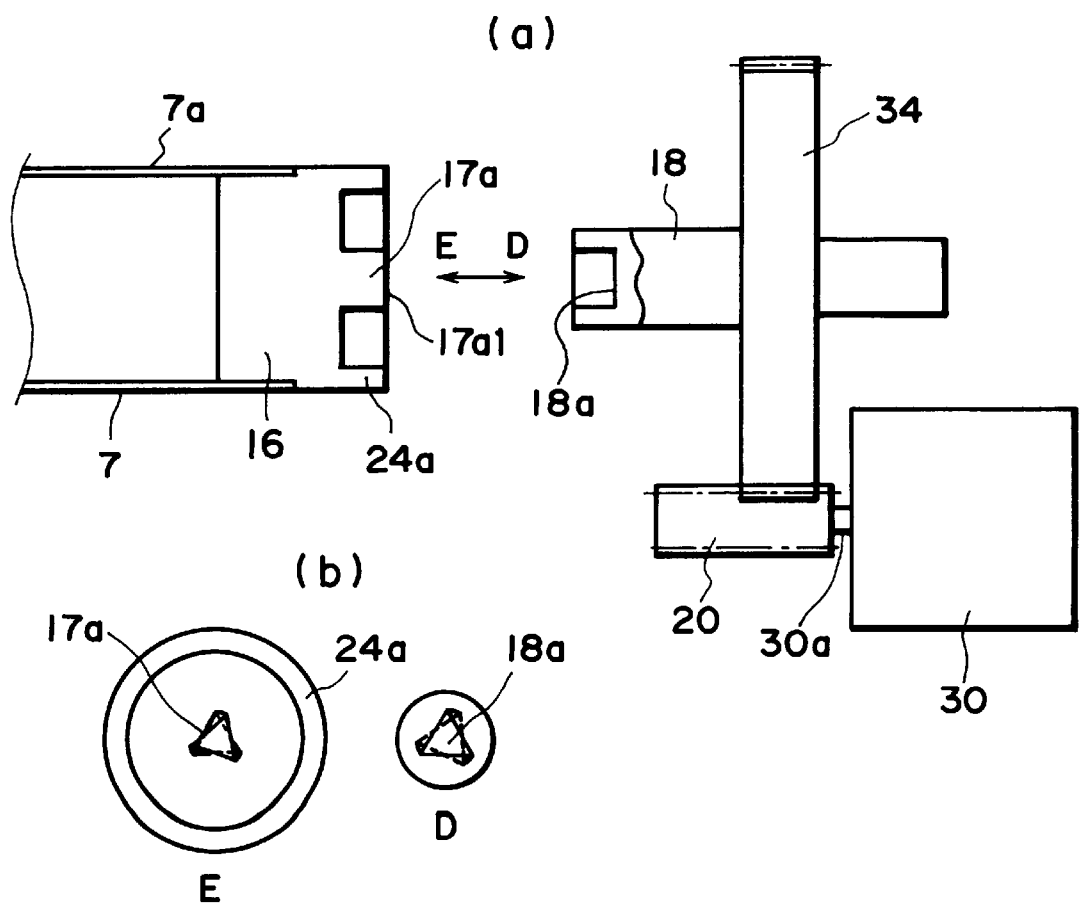
FIGS. 23(a) and (b) are views of a male shaft in the form of a twisted triangular prism provided on the process cartridge and an engageable female shaft provided in the main assembly of a device, according to an embodiment of the present invention.

Referring to FIG. 23, a description will be provided as to a further embodiment. The embodiment of FIG. 23 is different from embodiment 1 in that the gear is not provided on the drum flange 16.

The coupling structure shown in FIGS. 3(a) and (b), is such that the main assembly side coupling means is of a female coupling shaft 17 of polyacetal (POM), and the coupling means of the cartridge side engageable therewith is of a male coupling shaft 18 of POM. A cylindrical wall portion 24, concentric with the photosensitive drum 7, is formed integrally with the flange 16 and is provided around the male coupling shaft 18. FIG. 3(b) is views as seen in the directions D and E of FIG. 3(a).

By the provision of a wall portion 24 having substantially the same height as the projection 18a around the male shaft 18, the projection 18a is not projected out beyond the cartridge frame, so that damage to the end portion f the projection 18a can be prevented.

The cylindrical wall portion 24 may also function as a guide for facilitating the mounting of the process cartridge B to the image forming apparatus A (FIG. 6, guide c), as described in the foregoing.

Embodiment 7

Figure 24:
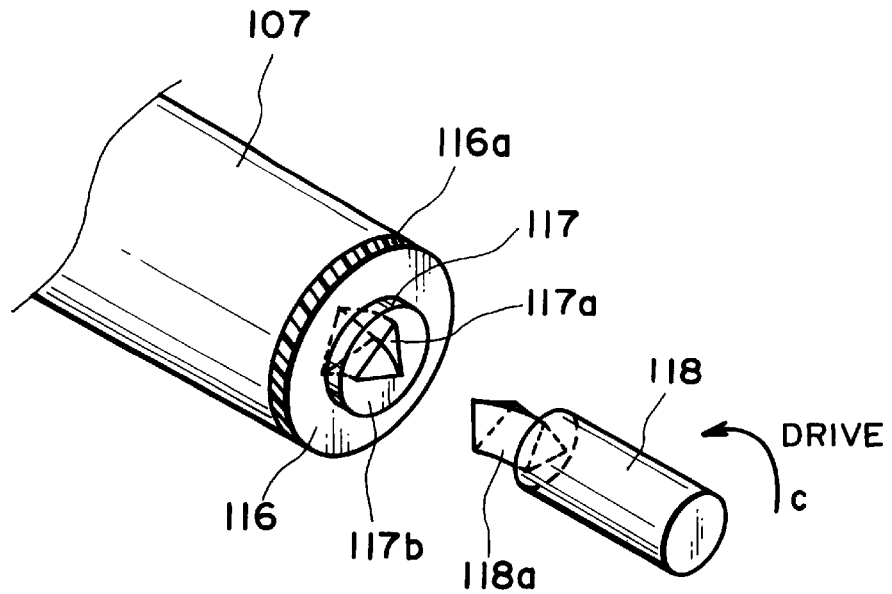
FIG. 24 is a perspective view of a twisted recess having a cross-section in the form of a triangle shape on the process cartridge, and a projection in the form of a complementary twisted triangular prism in the main assembly of the device, according to and embodiment of the present invention.
Figure 25:
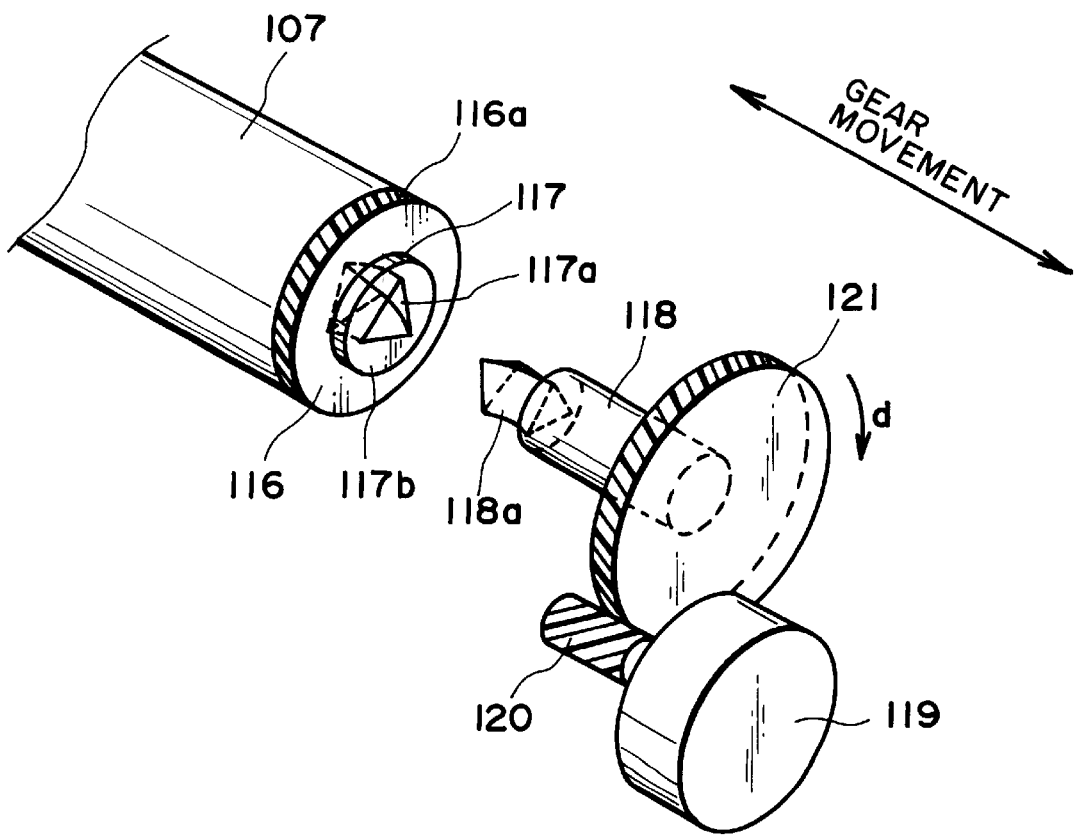
FIG. 25 is a perspective view of a driving mechanism of the coupling FIG. 24.

Referring to FIG. 24 and 25, another embodiment will be described. In this embodiment, as contrasted to the above-described embodiment, the drum flange 116 of the photosensitive drum 7 is provided with a female shaft 117, and the large diameter gear 121 of the main assembly 13 of the apparatus is provided with a male shaft 118. The rotation accuracy can be improved, with this structure, too.

As shown in FIG. 24, the substantially positive triangular prism of the projection 118a of the male coupling shaft 118 is twisted in the rotation direction, and the recess 117a of the female coupling shaft 117 is twisted correspondingly in the rotation direction. A seat 117b is provided at the end surface of the female coupling shaft 117.

By the twisting of the engaging portion in the rotation direction, the male coupling shaft 118 pulls the female shaft 117 until it abuts to the seat 117b when the male coupling shaft 118 is rotated in the direction c for image formation while they are engaged. As a result, the combination therebetween is further assure.

When the process cartridge B is demounted from the main assembly 13, motor 119 may be rotated in the opposite direction indicated by arrow d, by which the engagement of the coupling is automatically released by the thrust produced by the meshing between the pinion gear 120 having the helical teeth and the transmission gear 121, as shown in FIG. 25.

In this example, if the tolerable transmission torque of the female shaft 117 is smaller than the tolerable transmission torque of the male shaft 118, damage to the male shaft 118 can be prevented.

For example, the female coupling shaft provided in the cartridge is made of polyacetal (POM), and the male coupling shaft constituted in the main assembly is made of zinc die-cast. By doing so, even if an abnormal torque is produced, damage to the male shaft is prevented since the tolerable transmission torque of the male coupling shaft of the main assembly side is large.

This embodiment is the same as embodiment 1 except that the female shaft is provided in the drum flange, and the male shaft is provided in the main assembly. Therefore, the embodiments of the electrophotographic image forming apparatus, the process cartridge, the drive transmission part and the electrophotographic photosensitive drum are the same as those of embodiment 1, except that the male shaft of the drum flange is replaced with the female shaft, and the female shaft of the gear of the main assembly is replaced with the male shaft, and therefore, the description of such embodiments are omitted for simplicity.

However, the process cartridge will be described briefly. It is a process cartridge B which is detachably mountable to a main assembly 13 of an electrophotographic image forming apparatus A. The electrophotographic image forming apparatus A comprises a motor 30 (119), the main assembly helical gear 34 (121) for receiving the driving force from the motor 30 (119), and a twisted triangular prism projection 118*a* integrally rotatable with the main assembly helical gear provided at the main assembly helical gear of the main assembly helical gear 34 (121). The electrophotographic image forming apparatus A operates to form an image on the recording medium. The process cartridge B comprises cartridge frames 12*a*, 12*b* and 12*c*, the electrophotographic photosensitive drum 7 (107), the charging roller 8 for charging the electrophotographic photosensitive drum 7 (107), the cleaning blade 11*a* for removing the residual toner from the electrophotographic photosensitive drum 7 (107), the developing roller 10*d* for developing the latent image formed on the electrophotographic photosensitive drum 7 (107), and a twisted triangular hole 117*a* engageable with the projection 118*a* provided at a longitudinal end of the electrophotographic photosensitive drum 7 (107), wherein the process cartridge B is mounted to the main assembly, and when the main assembly helical gear 34 (121) is rotated with the hole 117*a* engaged with the projection 118*a*, the rotational force is transmitted from the main assembly helical gear 34 (121) to the drum 7 (121) while the hole 117*a* is kept pulled toward the projection 118*a*. The hole 117*a* is formed as a recess at a leading edge of the shaft portion 17 (117) provided at the central portion of the drum helical gear 16*a* (116*a*). The drum helical gear 16*a* (116*a*) functions to transmit the rotation force to the developing roller 10*d*. The shaft portion 17 (117) functions to rotatably support the electrophotographic photosensitive drum 7 (107) on the cartridge frame 112*c*. The drum helical gear 16 (116*a*) of the hole 117 and the shaft portion 17 (117) are integrally formed from resin material. The outer diameter D1 of the electrophotographic photosensitive drum 7 (107), the outer diameter F of the shaft portion, and the diameter C of the circumscribed circle of the hole configuration 117*a*, satisfy D1>F>C.

The outer diameter F of the shaft portion 17 (117), the diameter C of the circumscribed circle of the hole configuration, the dedendum diameter G of the gear 16*a* of the electrophotographic photosensitive drum 7, and the inner diameter D2 of the electrophotographic photosensitive drum 7, satisfy G>D2 and G>F>C. When the outer diameter D1 of the electrophotographic photosensitive drum 7 (107) is denoted by D1, and the dedendum circle diameter of the main assembly gear 34 (121) is denoted by L, L is preferably not less than approximately 1.0 times D1 and not more than 5.0 times D1. The module of the main assembly gear 34 (121) is approximately 0.4–0.7. The dedendum diameter L of the main assembly gear of the device is approximately 30 mm–150 mm, and the number of teeth of the main assembly gear 34 is approximately 40 teeth–400 teeth.

In this example, the direction of twisting of the projection 118*a* as seen from the photosensitive drum 7 (107) is the same as the rotation direction of the photosensitive drum 7 (107) in the direction from the base portion of the projection 118*a* toward the end, and that of the hole 117*a* is the same in the direction from the inlet of the hole 117*a* toward the inside thereof. The twisting direction of the drum flange 16*a* (116*a*) is opposite from the twisting direction of the hole 117*a*.

Embodiment 8

Figure 26:
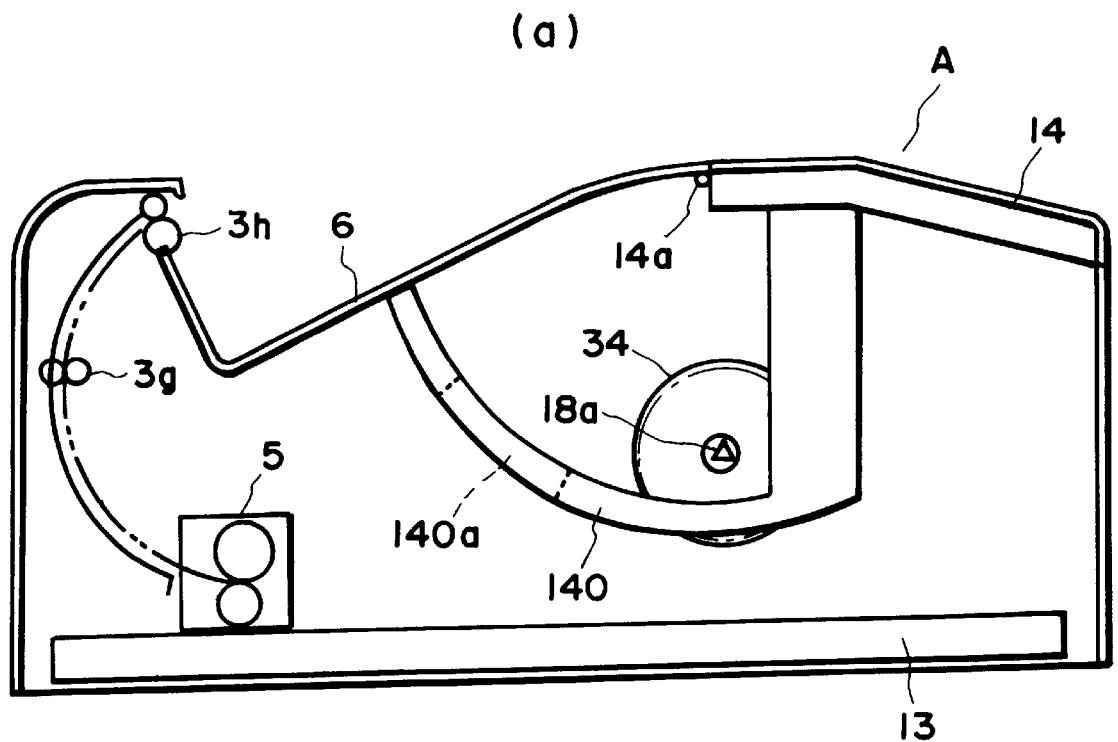
FIGS. 26(a) and (b) illustrate an interrelation mechanism of a driving means and an openable cover according to an embodiment of the present invention.
Figure 26:
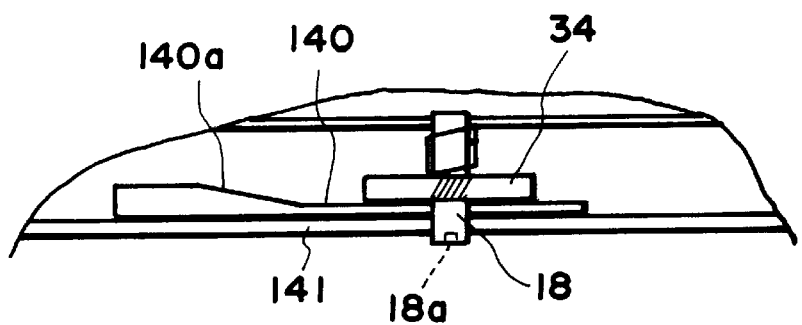
Figure 27:
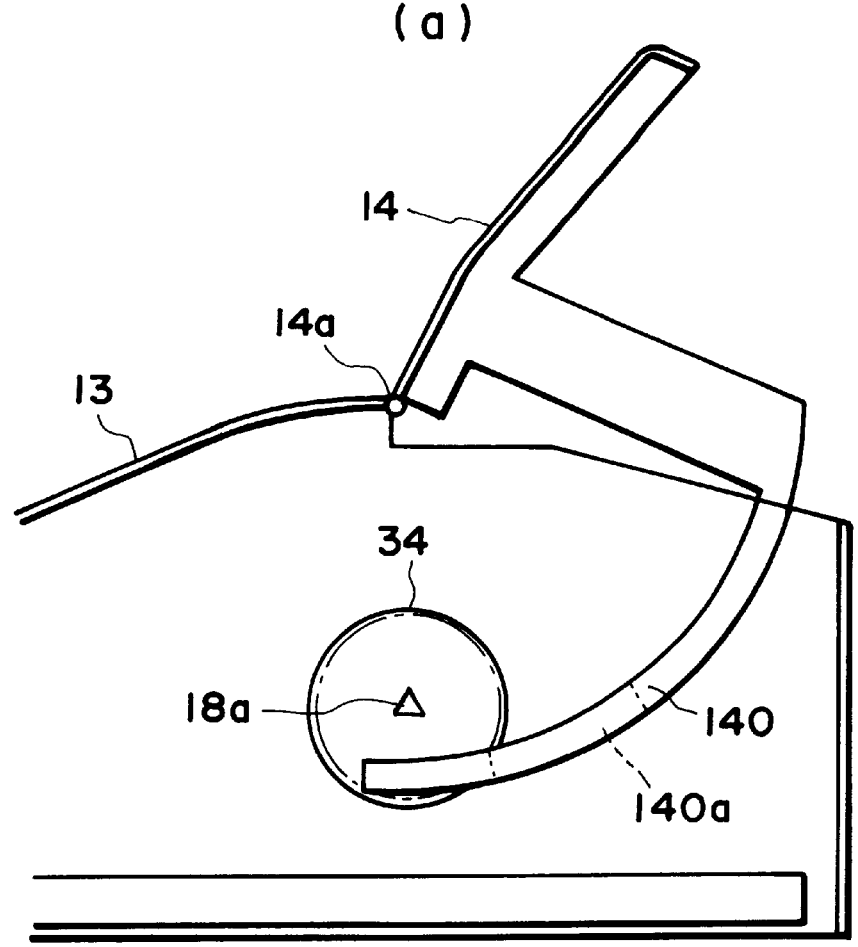
FIGS. 27(a) and (b) illustrate an interrelation mechanism of driving means and an openable cover according to an embodiment of the present invention.
Figure 27:
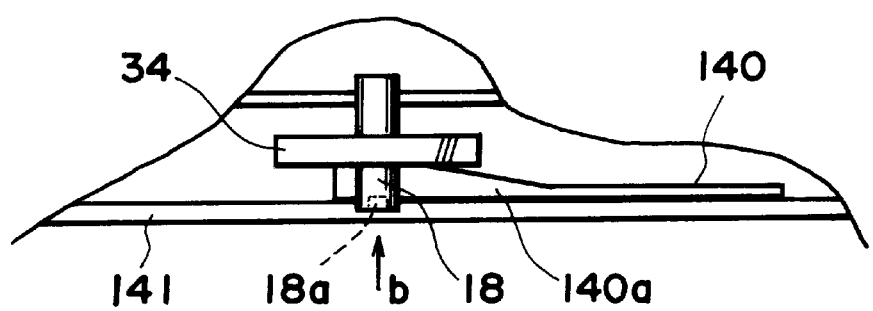

In embodiment 1, when the cover 14 is opened, the rod 37 and the cam 35 are operated in interrelation therewith to release the engagement between the coupling projection 17*a* and the recess 18*a*. The coupling release structure may be as disclosed in FIGS. 26 and 27.

The openable cover 14 is provided with an arcuate releasing member 140 at the center of the shaft 14*a*, as shown in FIG. 6(*a*), and the leading edge of the releasing member 140 is formed into a cam portion 140*a* having a gradually increasing thickness, as shown in FIG. 6(*b*). As shown in FIGS. 7(*a*) and (*b*), when the cover 114 is opened to demount the process cartridge B the cam portion 140*a* enters the space between the wall portion 141 and the gear 34 integral with the female shaft 18 to push the side surface of the gear 34 out in the direction indicated by arrow b in FIG. 27. By this, the female shaft 18 is retracted from the wall portion 141 so that the engagement with the male coupling shaft 17 of the photosensitive drum 7 is released to permit smooth demounting of the process cartridge B.

The member for mounting the releasing member 140 is not limited to the openable cover 14 if it is a member operated when the process cartridge B is mounted or demounted. When the drive transmission gear 34 is a helical gear, the releasing member 140 is not inevitable, and the coupling release is possible by the thrust produced by the helical gear.

Referring to FIGS. 28–31, a description will be provided as to positioning of the process cartridge relative to the main assembly of the apparatus 13 in the longitudinal direction of the photosensitive drum.

In the following embodiment, different reference numerals are used, but the structure is quite similar to the foregoing embodiment. However, the positioning of the process cartridge B relative to the main assembly of the apparatus in the longitudinal direction of the photosensitive drum, will be described in more detail. Some part of the description will be repeated for easy understanding.

Figure 28:
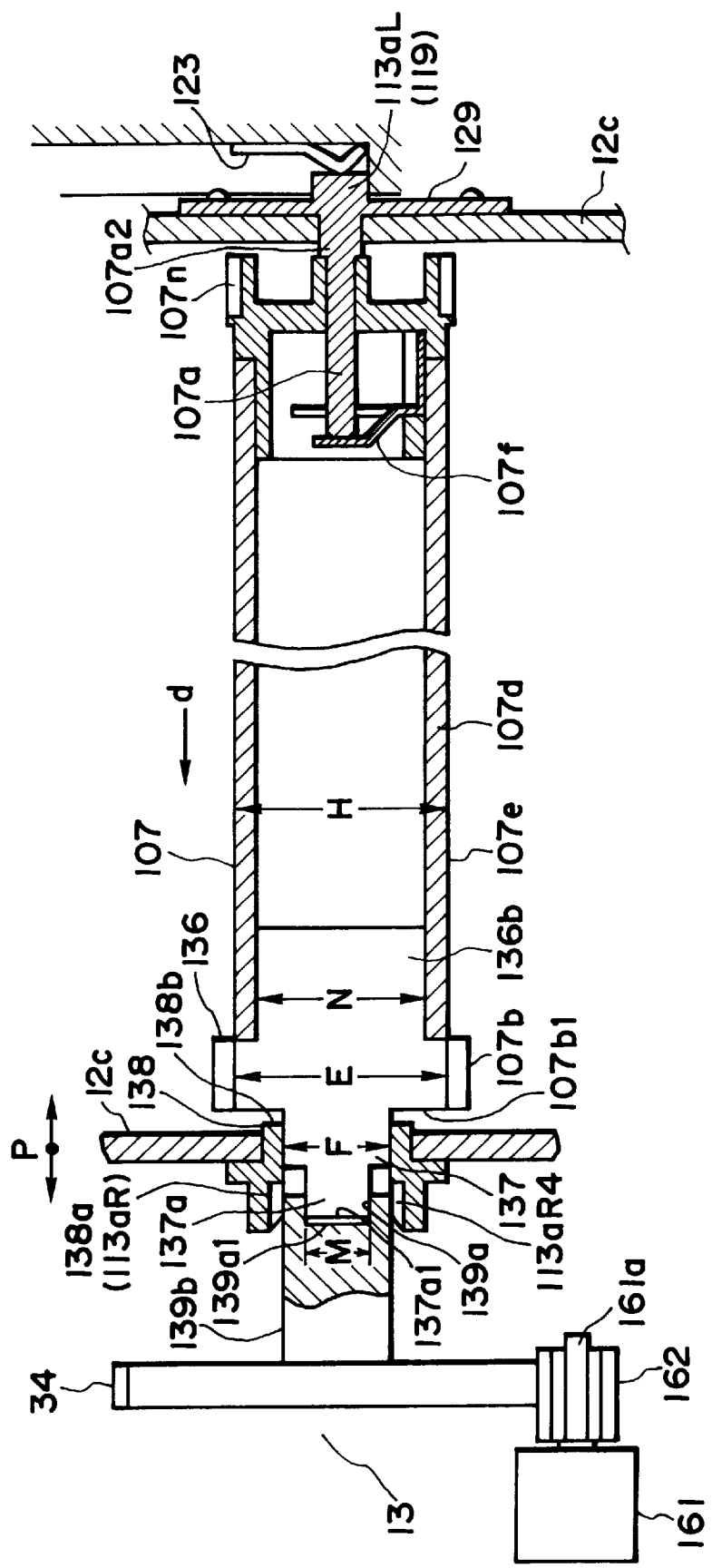
FIG. 28 is a longitudinal sectional view of a photosensitive drum and a driving device therefor.

FIG. 28 is a longitudinal sectional view of a coupling portion in the state of the photosensitive drum 107 being mounted to the process cartridge B.

As shown in FIG. 28, there is provided a coupling means on the cartridge at one longitudinal end of the photosensitive drum 107 mounted the process cartridge B. The coupling means is in the form of a male coupling shaft 137 (circular column configuration) provided on a drum flange 136 fixed to the end of the photosensitive drum 107, and a free end surface of the male shaft 137 has a projection 137a. A free end surface of the projection 137a is parallel with the end surface of the male shaft 137. The male shaft 137 is supported by a bearing 138 and functions as a drum shaft. In this example, the drum flange 136, the male coupling shaft 137 and the projection 137a, are integral. The drum flange 136 is provided with an integral drum gear 107b in the form of a helical gear to transmit the driving force to a developing roller 9c10d (FIG. 2) in the process cartridge B. Therefore, as shown in FIG. 28, the drum flange 136 of this embodiment, is an integrally molded member having the drum gear 107b, the male shaft 137 and the projection 137a, and is a driving force transmission part for transmitting the driving force.

The configuration of the projection 137a is, similarly to the foregoing embodiment, a twisted prism. The recess 139a for engaging with the projection 137a is a polygonal (cross-section) hole slightly twisted in the rotational direction along the axial direction. The projection 137a and the recess 139a have the same twisting pitches, and are twisted in the same direction. The recess 139a has a substantially triangular cross-section. The recess 139a is provided on a female coupling shaft 139b integral with the gear 34 provided in the main assembly 13. The female coupling shaft 139b, as has been described hereinbefore, is supported by the main assembly of the apparatus for rotation and for axial movement. With the structure of the example, when the process cartridge B is mounted to the main assembly of the apparatus, and the projection 137a and the recess 139a of the main assembly of the apparatus are engaged with each other to transmit the rotating force from the recess 139a to the projection 137a, the edge line of the projection 137a of the substantially equilateral triangular prism and the inner surface of the recess 139a contact uniformly. To accomplish this, the diameter of the circumscribed circle of the coupling projection 137a is larger than that of the inscribed circle of the coupling recess 139a, and is smaller than that of the circumscribed circle of the coupling recess 139a. Furthermore, because of the configuration of the twisting, a force is produced in a direction of the recess 139a attracting the projection 137a so that a free end surface of the projection 137a1 is brought into contact with the bottom surface of the recess 139a. By this arrangement, the position of the process cartridge is determined in the longitudinal and radial directions of the photosensitive drum 7 relative to the main assembly 14 of the image forming apparatus. Therefore, the position of the process cartridge B relative to the main assembly of the apparatus in the longitudinal direction of the photosensitive drum 7, is determined. The twisting direction of the drum gear 107b is the direction in which a thrust force is produced in the direction of the arrow d, in this example. The thrust forces in the coupling portion and the drum gear 107b, are both directed as indicated by the arrow d, and therefore, the position of the photosensitive drum 7 integral with the projection 137a in the axial and radial directions, is stably determined in the main assembly 13 of the image forming apparatus.

In this example, the twisting direction of the projection 137a is opposite from the rotational direction of the photosensitive drum 107 toward the free end away from the bottom trunk of the projection 137a, as seen from the photosensitive drum 107; and the twisting direction of the recess 139a is opposite therefrom toward the inside away from the inlet of the recess 139a. The twisting direction of the drum gear 107b of the drum flange 136 is opposite from the twisting direction of the projection 137a.

The male shaft 137 and the projection 137a are disposed on the drum flange 136 such that when the drum flange 136 is mounted to the end of the photosensitive drum 107, they are coaxial with the photosensitive drum 107. Designated by 136b is a fixing portion where the drum flange 136 is fixed to the inner surface of the drum cylinder 107d when the drum flange 136 is mounted to the photosensitive drum 107. The fixing of the drum flange 136 to the photosensitive drum 107, may be by crimping or bonding. The circumferential surface of the drum cylinder 107d is coated with a photosensitive layer 107e.

As described in the foregoing, the other end of the photosensitive drum 107 is provided with a spur gear 107n fixed thereto.

The material of the drum flange 136 and the spur gear 107n may be polyacetal, polycarbonate, polyamide, polybutylene terephthalate or anther resin material. Another material may also be used.

Around the projection 137a of the male coupling shaft 137 of the process cartridge B, there is provided a cylindrical projection 138a (cylindrical guide 113aR) coaxial with the male shaft 137 and integral with the bearing 138 fixed to the cleaning frame 12c. By the projection 138a, the projection 137a of the male coupling shaft 137 is protected upon the mounting-and-demounting of the process cartridge B, or the like, thus protecting it from damage or deformation or the like due to an external force. Thus, play or the vibration during the coupling driving due to damage to the projection 137a, can be prevented.

The bearing 138 may also function as a guiding member for mounting-and-demounting of the process cartridge B relative to the main assembly 13 of the image forming apparatus. More particularly, when the process cartridge B is mounted to the main assembly 13 of the image forming apparatus, the projection 138a of the bearing 138 contacts the guide portion 15c (FIG. 6) of the main assembly, so that projection 138a functions as a positioning guide to the mounting position to facilitate the mounting thereof to main assembly 13. When the process cartridge B is mounted to the mounting position, the projection 138a is supported in the positioning groove 15d provided in the guide portion 15c.

Among the photosensitive the drum 107, drum flange 136 and the male coupling shaft 137, there is a relationship as shown in FIG. 28. More particularly, H>F≧M, and E>N, where H is an outer diameter of the photosensitive drum 107; E is a dedendum circle diameter of the drum gear 107b; F is a bearing diameter of the photosensitive drum 107 (the outer diameter of the shaft portion male coupling shaft 137, and the inner diameter of the bearing 138); M is a circumscribed circle diameter of the coupling projection 137a; and N is a diameter of the engaging portion of the photosensitive drum 107 with the drum flange 136 (drum inner diameter).

By making H>F, the sliding load torque at the bearing portion is smaller than in the case of bearing the drum cylinder 107d; by making F≧M, the molding structure can be simplified because there is no undercut portion when a mold for the flange is divided in the direction of the arrow p as usual.

Furthermore, by the relation of E>N, the mold having the configuration of the gear portion is disposed on the left side mold as seen in the mounting direction of the process cartridge B, and therefore, the right-hand side mold may be simple, thus improving the durability of the mold.

On the other hand, the main assembly 13 of the image forming apparatus is provided with a coupling means of the main assembly. The coupling means of the main assembly has a female coupling shaft 139b (in the form of a circular column) (FIG. 28) at a position in alignment with the rotation axis of the photosensitive drum when the process cartridge B is insertion thereinto. The female coupling shaft 139b, as shown in FIG. 28, is a driving shaft integral with a large gear 34 for transmitting the driving force from the motor 161 to the photosensitive drum 107, and the female shaft 139b is projected from one side of the large gear 34 coaxially therewith. In this embodiment, the large gear 34 and the female coupling shaft 139b are integrally produced by a mold.

The large gear 34 in the main assembly 13 is a helical gear, which is in meshing engagement with a small helical gear 162 integral with or fixed to the shaft 161a of the motor 161. The gears have such twisting directions and the inclination angles that when the driving force is transmitted from the small gear 162, thrust is produced tending to move the female shaft 139b toward the male shaft 137. By this, when the motor 161 is driven upon image formation, the thrust is effective to move the female shaft 139b toward the male shaft 137 so as to engage the recess 139a with projection 137a. The recess 139a is disposed at a free end of the female shaft 139b and at the center of rotation of the female shaft 139b.

In this embodiment, the driving force is directly transmitted from the small gear 162 provided on the motor shaft 161a to the large gear 34, but this is not inevitable, and a gear train is usable for speed reduction and drive transmission. Other alternatives include a belt-pulley, a pair of friction rollers, a timing belt plus pulley, or the like.

In FIG. 28, designated by 119 is a drum grounding contact. The grounding contact 119 is coaxially provided with the drum shaft 107a integral with the flange 129 of an electroconductive material. To the drum shaft 107a, a grounding plate 107f electrically connected with the drum cylinder 107d, is press-contacted so that charge is discharged to outside. In this example, the flange 129 is composed of a metal such as iron.

An end 107b1 of the drum gear 107b abuts an inside end surface 138b of the bearing 138 fixed to the cleaning arm 12c. By this arrangement, the axial position of the photosensitive drum 107 is determined in the process cartridge B.

A description will be provided as to the configurations of the projection 137a and the recess 139a which constitute an engaging portion of the coupling means.

The female coupling shaft 139b in the main assembly 13 is movable in the axial direction, as has been described hereinbefore, but is not movable in the radial direction (radial direction). On the other hand, the process cartridge B is mounted in the main assembly 13 for movement in the longitudinal direction and in the cartridge mounting direction. In the longitudinal direction, the process cartridge B is slightly movable between the guiding members 116R, 116L provided in the cartridge mounting space.

When the process cartridge B is mounted to the main assembly 13, a cylindrical shaft 113aL (FIG. 28) formed on the flange 129 at the other longitudinal end of the cleaning frame 12c is engaged into a positioning groove 15b (FIG. 5) of the main assembly 13 without a gap, so that correct positioning is provided, and a spur gear 107n fixed to the photosensitive drum 107 is brought into meshing engagement with a gear (not shown) for transmitting the driving force to the transfer roller 4 (FIG. 1). On the other hand, at the driving side of the photosensitive drum 107, a cylindrical guide 113aR provided on the cleaning frame 12c, is supported by the positioning groove 15d (FIG. 5).

By the cylindrical guide 113aR being supported by the positioning groove 15d of the main assembly 13, the axes of the drum shaft 107a and the female shaft 139b are aligned within a concentricity of 2.00 mm, and a first alignment function in the coupling process is completed.

By closing the openable cover 14, the coupling recess 139a moves horizontally to enter the projection 137a (similar to the state shown in FIG. 16).

Subsequently, the driving side (coupling side) is positioned, and the drive transmission is carried out, in the following manner.

When the driving motor 161 of the main assembly 14 is rotated, the female coupling shaft 139b is moved toward the male coupling shaft 137 (the direction opposite from the direction of arrow d in FIG. 28), and at the time when the phases are aligned between the male coupling shaft 137 and the recess 139a (in this example, since the projection 137a and the recess 139a have substantially equilateral triangle cross-sections, the phases are aligned for each 120 degrees), they are engaged with each other, so that a rotational driving force is transmitted from the main assembly of the apparatus to the recess 139a (from the state shown in FIG. 17 to the state shown in FIG. 16).

When the coupling projection 137a enters the recess 139a, the entering action is smooth, since the sizes of the substantially equilateral triangles are such that the cross-section of the coupling recess 139a is larger than that of the coupling projection 137a.

If, however, the gap therebetween is too large, the rigidity of the coupling against the twist is lowered because of:

(1) the decrease of the rigidity due to change of the cross-sectional configuration of the projection 137a; and (2) the increase in resistance at the contact point due to the decrease of the contact portion radius.

If this occurs, the resultant images would not be uniform.

In this embodiment, in view of the desirable twisting rigidity, the lower limit value of the inscribed circle diameter of the triangular shape of the projection is 8.0 mm, and the inscribed circle diameter used is 8.5 mm, and the inscribed circle diameter of the recess triangular shape is 9.5 mm, and therefore, the gap is 0.5 mm.

When the gap is small, a quite high concentricity has to be accomplished before the engagement.

In this embodiment, the concentricity of 1.0 mm is accomplished with the gap of 0.5 mm to permit the proper engagement. To accomplish this, the projection length of the bearing projection 138 is made larger than that of the coupling projection 137a. In addition, by a plurality of (not less than three) projected guides 113aR4 in the bearing projection 138a, the outer diameter portion of the female shaft 139a is guided, so that concentricity between the projection 137 and the female shaft 139a before the coupling engagement, is made not more than 1.0 mm, thus stabilizing the engaging process of the coupling (second alignment function).

When the female coupling shaft 139b is rotated at the time of image formation with the coupling projection 137a in the recess 139a, the inner surface of the coupling recess 139a and the three edge lines of the substantially equilateral triangle column of the projection 137a, are contacted to permit the driving force transmission. The male coupling shaft 137 instantaneously moves such that edge lines and the inner surface of the coupling recess 139a are uniformly contacted, that is, the axes of the male coupling shaft 137 and the female shaft 139b are aligned.

Thus, automatic alignment is accomplished between the male coupling shaft 137 and the female shaft 139b upon the driving of the motor 161. By the transmission of the driving force to the photosensitive drum 107, a rotating moment is applied to the process cartridge B, and is effective to increase the contact force between a regulating abutment 12c1 on the upper surface of the cleaning frame 12c of the process cartridge B and the fixing member 13a (FIG. 1) fixed to the main assembly 13 of the image forming apparatus, thus positioning the process cartridge B precisely relative to the main assembly 13 of the image forming apparatus.

When driving is not effected, that is, when no image is formed, the engagement and disengagement of the coupling are easy, since a gap is provided in the radial direction between the coupling projection 137a and the recess 139a. During driving, the contact force in the coupling portion is stabilized so that possible play or vibration there are suppressed.

In this embodiment, the configurations of the coupling projection and the recess are a substantially equilateral triangle, but the similar effects are provided if they are a substantially equilateral polygonal. The equilateral polygonal shape is preferable since the positioning is precise, but a non-equilateral shape is usable if a force toward each other is produced. As an alternative, a screw having a large lead is usable as the coupling projection, wherein a female screw for threading engagement with the coupling projection is usable as the coupling recess. Three-lead triangle screws of male and female shapes of this modification, correspond to the above-described coupling projection and the recess.

When the coupling projection and the recess are compared, the projection is easily damaged, and has less strength than the recess. Therefore, in this embodiment, the coupling projection is provided in the exchangeable process cartridge B, and the coupling recess, which is required to have a higher durability, is provided in the main assembly 13 of the image forming apparatus.

A description will be provided as to the positioning of the process cartridge B in the longitudinal direction of the photosensitive drum relative to the main assembly 13 of the apparatus.

As described hereinbefore, according to this embodiment, the projection end 137a1 abuts to the bottom surface 139a1 of the recess by the recess 139a of the female coupling shaft 139b pulling the projection 137a of the male coupling shaft 137 in. By this, the process cartridge is correctly positioned in the axial direction of the photosensitive drum 107.

To permit this axial position by the abutment between the projection end 137a1 and the bottom surface 139a1, the photosensitive drum 107 is movable in the axial direction relative to the main assembly 13. This will be described in more detail.

The usable arrangements for permitting the movement in the longitudinal direction of the photosensitive drum 107 are as follows.

With respect to the shaft coupling for transmitting the rotating force to the process cartridge B from the main assembly of the apparatus, the female coupling shaft 139b as the driving side shaft coupling member is such that coupling recess 139a attracts the projection 137a in the axial direction upon the rotation while the recess 139a and the projection 137a are in engagement with each other.

(1-a) the photosensitive drum 107 is movable in the longitudinal direction relative to the cartridge frame, more particularly, the cleaning frame 12c; or (1-b) the photosensitive drum 107 is not movable in the longitudinal direction relative to the cleaning frame 12c.

(2-a) the cartridge frame of the process cartridge B, more particularly, the cleaning frame 12c supporting the photosensitive drum 107 is movable in the longitudinal direction relative to the cartridge mounting portion of the main assembly 13 of the apparatus, when the process cartridge is mounted to the main assembly 13. (2-b) the cleaning frame 12c is not movable in the longitudinal direction, when the process cartridge is mounted to the cartridge mounting portion of the main assembly of the apparatus.

In this embodiment, the end surface 137a1 of the projection 137 abuts to the bottom surface of the recess 139a to accomplish the positioning. The positional relation between the photosensitive drum 107 and the frame of the process cartridge B, will be described. In the drawing which will be referred to, the shaft coupling, the process cartridge B and the cartridge mounting portion of the main assembly of the apparatus, are schematically shown. When the photosensitive drum 107 is moved toward the non-driving side, the axial movement of the photosensitive drum 107 is stopped by a stepped portion at the boundary of the expanded diameter portion 107a2 of the drum shaft 107a, in this embodiment. However, with such a positional relation, the projection 137a and the recess 139a are engaged, and the end surface of the projection 137a1 and the recess the bottom surface 139a1 are spaced apart. Therefore, the axial movement toward the non-driving side of the photosensitive drum 107 is determined in effect by the cleaning frame 12c, and therefore, the following description will be provided as to the relation between the photosensitive drum 107 and the cleaning frame 12c.

Figure 29:
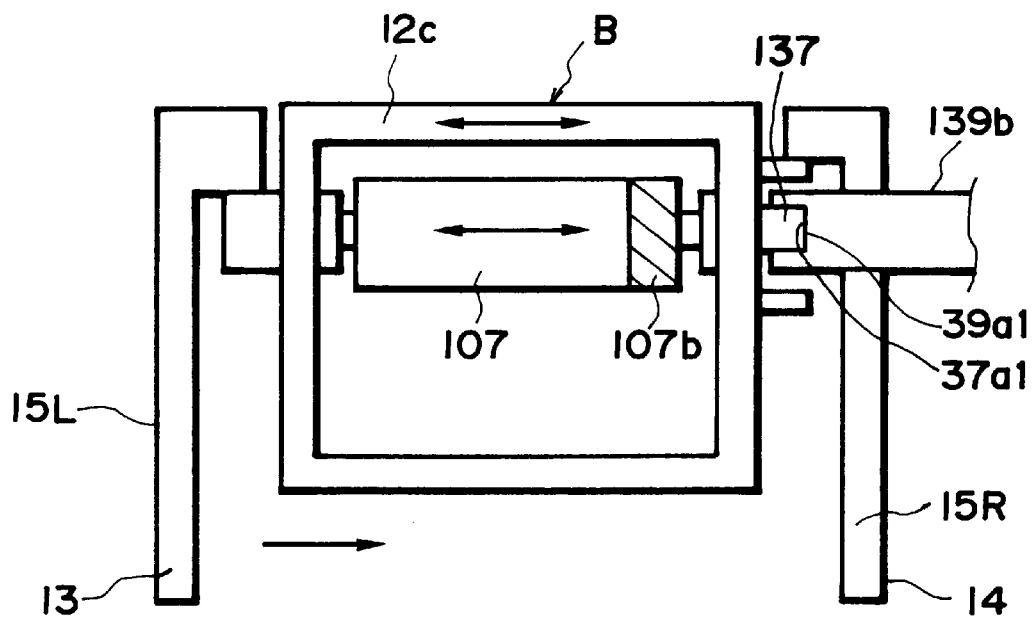
FIG. 29 is a schematic plan view showing a positioned state of a process cartridge relative to the main assembly of the apparatus in the longitudinal direction of a photosensitive drum.

FIG. 29 shows a case wherein the photosensitive drum 107 is movable in the longitudinal direction relative to the cleaning frame 12c (indicated by double headed arrow), and the cleaning frame 12c is movable in the longitudinal direction between the guiding members 15 (15L, 15R) (indicated by double headed arrow). In this case, when the shaft coupling is engaged, the male coupling shaft 137 is attracted toward the female coupling shaft 139b, so that an end surface of the projection 137a1 abuts to the bottom surface 139a1 of the recess, thus determining the axial position of the photosensitive drum 107. When the longitudinal position of the photosensitive drum 107 is determined, the cleaning frame 12c is urged in the direction opposite from the direction indicated by arrow d by the press-contact force between the drum shaft 107a and the grounding plate 107f, so that the photosensitive drum side end 138b of the bearing 138 abuts the end 107b1 of the drum gear 107b, by which the position thereof is determined. Thus, the position of the process cartridge B relative to the mounting position of the main assembly in the longitudinal direction of the photosensitive drum 107, is determined.

Figure 30:
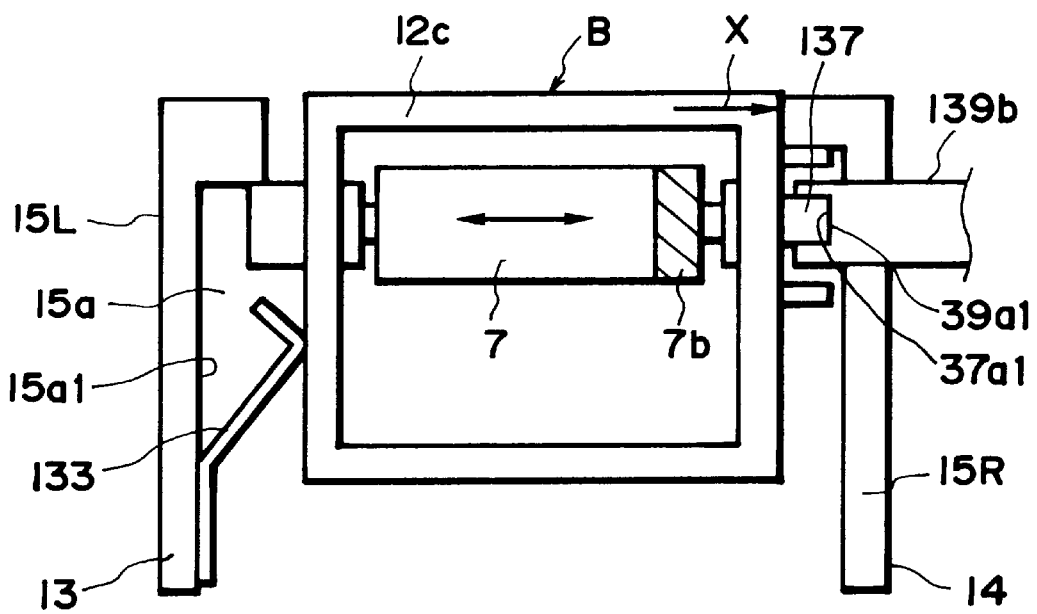
FIG. 30 is a schematic plan view showing a positioned state of a process cartridge relative to the main assembly of the apparatus in the longitudinal direction of a photosensitive drum.

FIG. 30 shows a case wherein the photosensitive drum 107 is movable in the longitudinal direction relative to the cleaning frame 12c, and the cleaning frame 12c is not movable in the longitudinal direction relative to the cartridge mounting portion of the main assembly of the apparatus by the elastic force of the leaf spring 133 disposed between the cleaning frame 12c and the bottom 15a of the guide portion 15a. An arrow X indicates the contact portion between the guiding member 15R and the cleaning frame 12c. The same applies to the case wherein the leaf spring 133 is not used, but the cleaning frame 12c is snugly engaged between the guiding members 15, and therefore, the process cartridge B is not movable in the longitudinal direction relative to the main assembly of the apparatus. In these cases, when the shaft coupling is engaged, the male coupling shaft 137 is attracted toward the female shaft 139b, and the end surface of the projection abuts to the bottom surface 139a1 of the recess so that axial position of the photosensitive drum 107 is determined. Namely, the position of the process cartridge B relative to the main assembly of the apparatus in the longitudinal direction of the photosensitive drum 107, is determined.

Figure 31:
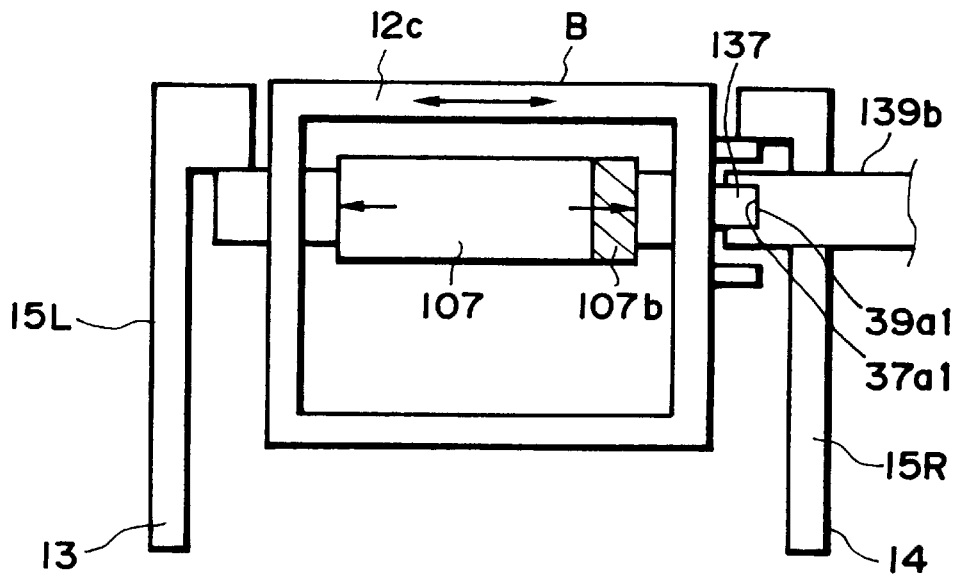
FIG. 31 is a schematic plan view showing a positioned state of a process cartridge relative to the main assembly of the apparatus in the longitudinal direction of a photosensitive drum.

FIG. 31 shows a case wherein the photosensitive drum 107 is not movable in the longitudinal direction relative to the cleaning frame 12c, but the cleaning frame 12c is movable in the longitudinal direction between the guiding members 15. In this case, when the shaft coupling is engaged, the male coupling shaft 137 is attracted toward the female coupling shaft 139b, and the end surface of the projection 137a1 abuts to the bottom surface 139a1 of the recess, so that the axial position of the photosensitive drum 107 is determined. Namely, the position of the process cartridge B relative to the main assembly 14 of the apparatus in the longitudinal direction of the photosensitive drum 7, is determined.

Thus, according to the embodiment, the precise positioning is accomplished in any cases (1-a), (1-b), (2-a), and (2-b).

In embodiment, by abutment between the backside of the outer cam 35 (FIG. 16) and a side of the large gear 34, the position of the female coupling shaft 39b in the direction indicated by the arrow P (FIG. 28) is determined. By this arrangement, the position of the bottom surface 139a1 of the recess is determined. The end surface of the projection is attracted and press-contacted to the bottom surface 139a1 of the recess, since the projection 137a is in the form of a twisted column of a substantially equilateral triangle, and correspondingly, the recess 139a is in the form of a twisted hole of a substantially equilateral triangle. By this arrangement, the axial position of the photosensitive drum 107 is determined stably during a driving operation. In other words, the position of the process cartridge B relative to the main assembly of the apparatus in the longitudinal direction, is stably determined.

Furthermore, since the twisting direction of the drum gear 7b is such that projection 37a is thrusted toward the recess 39a, the axial position of the photosensitive drum 7 is stabilized. Namely, the position of the process cartridge B relative to the main assembly of the apparatus in the longitudinal direction of photosensitive drum 7, is stably determined.

In this example, the projection 137a is provided on the drum flange 136, and the recess 139a is provided in the shaft 139b disposed at the center of the large gear 34 of the rotatable member. It is a usable alternative that recess 139a is provided in the drum flange 136, and a projection 137a is provided on the shaft 139b disposed at the center of the large gear 34.

In the foregoing description, the twisting direction of the recess 139a, namely the hole (projection), is such as to twist toward the bottom of the hole from the inlet thereof in the opposite direction from the rotational direction of the gear.

The twisting amount of the hole (projection) is 1°–15° in the rotational direction per axial length of 1 mm.

In this embodiment, the depth of the hole is approximately 4 mm, and the twisting amount is approximately 30°.

Figure 32:
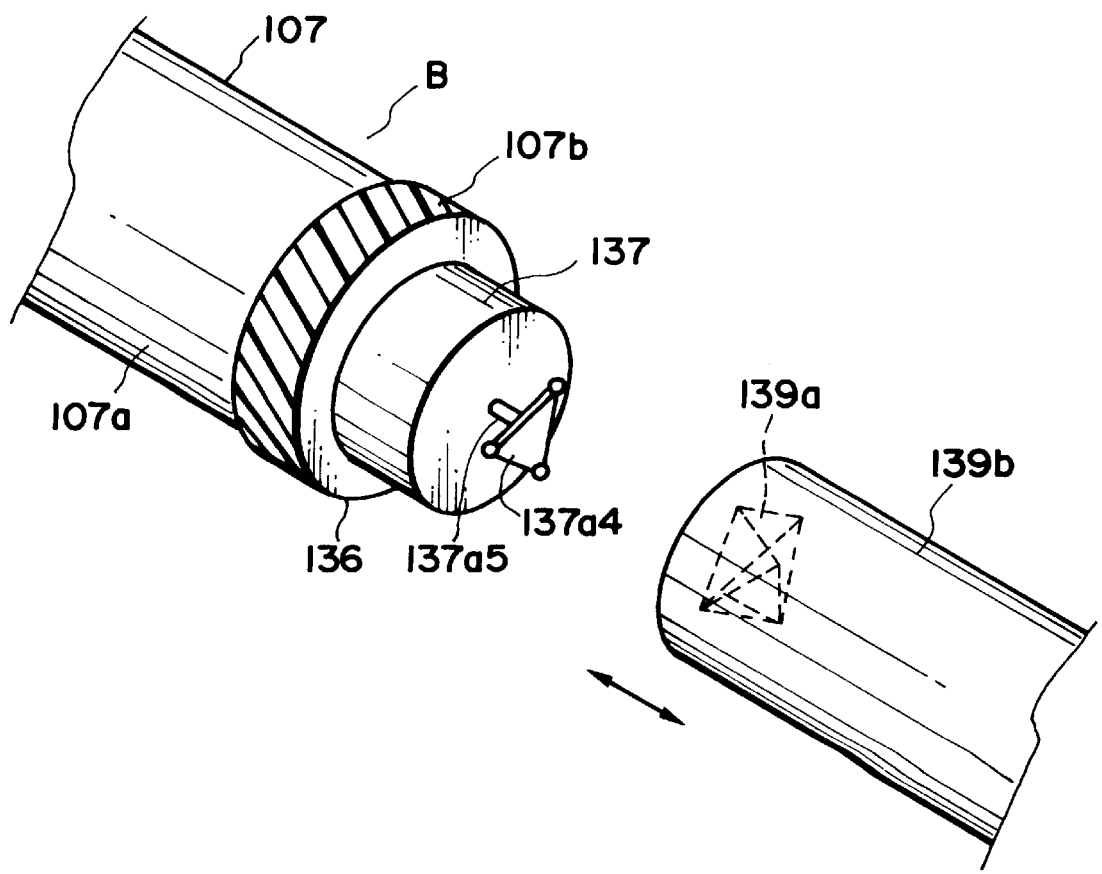
FIG. 32 is a perspective view of a coupling according to another embodiment of the present invention.

In the embodiments, the projection 137a is in the form of a polygonal prism. FIG. 32 shows a usable alternative wherein a supporting shaft 137a5 is provided at the center of the male shaft 137, and a non-twisted triangular plate 107a4 is mounted to the free end thereof, and is engaged into the twisted triangular hole of the recess 139a.

Further Embodiment

In the first embodiment, the coupling of the photosensitive drum is constituted as a male shaft 17, and the coupling of the main assembly is constituted as a female shaft 18, but the female shaft and the male shaft may be exchanged. In such a case, the same advantageous effects in the rotation accuracy of the photosensitive drum can be provided (FIGS. 23 and 24). In this example, if the tolerable transmission torque of the female shaft of the photosensitive drum is smaller than the tolerable transmission torque of the male shaft of the main assembly, the damage of the male shaft of the main assembly can be prevented.

For example, the female coupling shaft provided in the cartridge is made of polyacetal (POM), and the male coupling shaft constituted in the main assembly is made of zinc die-cast. By doing so, even if an abnormal torque is produced, damage to the male shaft is prevented since the tolerable transmission torque of the male coupling shaft of the main assembly side is large.

In the above-described embodiment, if a taper is formed at the end portion of the projection 17a or at the inlet portion of the recess 18a or at both, the combination between the projection 17a and the recess 18a is smoother.

In the foregoing, the process cartridge has been described as a cartridge for monochromatic image formation, but it is applicable to a cartridge for forming a multi-color image (two color, three color or full-color image, for example) if a plurality of developing means are used.

As for the developing method, any known methods such as a two-component magnetic brush developing method, a cascade developing method, a touch-down developing method, cloud developing method or the like can be used.

As for the electrophotographic photosensitive member, usable ones include amorphous silicon, amorphous selenium, zinc oxide, titanium oxide, organic photoconductor (OPC) and the like. As for methods for mountings photosensitive material, a photoconductor is evaporated or painted or applied on a cylinder of aluminum alloy or the like.

As for the charging means, a so-called contact type charging method is used in the foregoing examples. However, another method, such as corona charging, is usable, in which a tungsten wire is enclosed by a metal shield of aluminum or the like at three sides of the wire, and positive or negative ions are produced by applying a high voltage to the tungsten wire, and the surface of the photosensitive drum is uniformly charged by moving positive or negative ions to the surface.

As for the charging means, a blade type (charging blade), a pad type, a block type, a rod type, a wire type or the like is usable in addition to the roller type.

As for the cleaning means for removing residual toner from the photosensitive drum, a fur brush, a magnetic brush or the like is usable, as well as the cleaning blade.

The process cartridge may contain a photosensitive member and at least one of process means. The process cartridge may contain a photosensitive drum and charging means and is made detachably mountable to a main assembly of the apparatus. The process cartridge may contain a photosensitive drum and developing means and is made detachably mountable to a main assembly of the apparatus. The process cartridge may contain a photosensitive drum and cleaning means and is made detachably mountable to a main assembly of the apparatus. The process cartridge may contain a photosensitive drum and at least two process means.

The process cartridge may contain a photosensitive drum and charging means, developing means or cleaning means, and is made detachably mountable to a main assembly of the apparatus. The process cartridge may contain a photosensitive drum and at least one of charging means, developing means and cleaning means, and is made detachably mountable to a main assembly of the apparatus. The process cartridge may contain a photosensitive drum and at least developing means, and is made detachably mountable to a main assembly of the apparatus. Since the process cartridge is detachably mountable to the main assembly of the image forming apparatus by the user, this means that the maintenance of the apparatus using the process cartridge can be performed by the user by exchanging the process cartridge.

The present invention is applicable to a non-cartridge type image forming apparatus wherein the photosensitive drum, the developing means or the like is directly mounted to the main assembly of the apparatus.

In the foregoing, a description has been provided as to a laser beam printer as an exemplary image forming apparatus, but the present invention is applicable to an electrophotographic copying machine, facsimile machine, word processor or anther image forming machine.

As described in the foregoing, according to the present invention, the rotation accuracy of the driving transmission is improved, so the rotation accuracy of the electrophotographic photosensitive drum has been improved.

Additionally, the driving force can be assuredly transmitted from the main assembly to the electrophotographic photosensitive drum.

Furthermore, when the driving force is transmitted (during image forming operation), the rotation center of the coupling of the main assembly of the apparatus and the coupling of the electrophotographic photosensitive drum can be substantially aligned.

Further, when the driving force is transmitted (during the image forming operation), the electrophotographic photosensitive drum is attracted toward the main assembly side, so that the positional accuracy of the photosensitive member and therefore the process cartridge relative to the main assembly is improved.

Further, when the driving transmission is not carried out (when the image is not formed), the drive transmission coupled state is released, so that the operativity in demounting of the process cartridge is improved. Additionally, the diameter of the diameter of the coupling portion is small.

While the invention has been described with reference to the structures disclosed herein, it is not confined to the details set forth and this application is intended to cover such modifications or changes as may come within the purposes of the improvements or the scope of the following claims.

What is claimed is:

1. An electrophotographic image forming apparatus for forming an image on a recording material, comprising:

an electrophotographic photosensitive drum;

charging means for charging said photosensitive drum;

developing means for developing a latent image formed on said photosensitive drum into a toner image;

transfer means for transferring the toner image onto the recording material;

fixing means for fixing the toner image on the recording material;

a motor;

a driving rotatable member for receiving a driving force from said motor;

a recess formed substantially at a center of said rotatable member, said recess having a polygonal cross-section;

a projection provided at a longitudinal end of said photosensitive drum, wherein when said driving rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly.

2. An apparatus according to claim 1, wherein said recess is formed in an end of a column projected from said rotatable member, and said projection is projected from an end of a shaft projected outwardly in the longitudinal direction from said photosensitive drum.

3. An apparatus according to claim 1 or 2, wherein said projection is provided at a drum gear side of said photosensitive drum, and said drum gear functions to transmit the driving force to a developing roller as said developing means.

4. An apparatus according to claim 3, wherein said main assembly side driving rotatable member and said drum gear are helical gears.

5. An apparatus according to claim 1 further comprising a circular or arcuate wall extending around said projection, wherein said wall functions as a guide for engagement between said recess and projection.

6. An apparatus according to claim 2, wherein said projection comprises a substantially triangular prism, wherein an outer diameter D1 of said photosensitive drum, an outer diameter F of said shaft and a diameter C of a circumscribed circle of said substantially triangular prism, satisfy:

$D1 > F \geq C$.

7. An apparatus according to claim 2, wherein said projection comprises a substantially triangular prism, wherein an outer diameter F of said shaft, a diameter C of a circumscribed circle of said substantially triangular prism, a dedendum diameter G of a drum gear of said photosensitive drum and an inner diameter of said photosensitive drum D2, satisfy:

$G > D2$, and $G > F \geq C$.

8. An apparatus according to claim 1 or 5, wherein an outer diameter D1 of said photosensitive drum and dedendum diameter L of said rotatable member, which is a gear, satisfy $1.0 \times D1 \leq L \leq 5.0 \times D1$.

9. An apparatus according to claim 1 or 5, wherein said main assembly side driving rotatable member, which is a gear, has a module of 0.4–0.7 and has a dedendum diameter L of 30–150 mm, and further has 40–400 teeth.

10. An apparatus according to claim 1, wherein said recess has a substantially triangular cross-section, and said projection has a substantially triangular cross-section, and wherein comers of triangular shape are beveled.

11. An apparatus according to claim 1, wherein said photosensitive drum and at least one of said charging means and said developing means are contained in a process cartridge which is detachably mountable.

12. An apparatus according to claim 11, further comprising an openable cover for permitting mounting and demounting of said process cartridge relative to said main assembly, and moving means for moving said recess away from said projection in interrelation with opening of said cover, and for moving said recess toward said projection in interrelation with closing of said cover.

13. An apparatus according to claim 1, wherein said recess has a twisted configuration, and said projection is in the form of a substantially polygonal flat plate.

14. A process cartridge detachably mountable to a main assembly of an image forming apparatus, wherein said main assembly includes a motor, a driving rotatable member for receiving a driving force from said motor and a recess formed substantially at a center of said rotatable member, said recess having a polygonal cross-section; said process cartridge comprising:

an electrophotographic photosensitive drum;

process means actable on said photosensitive drum; and a projection provided at a longitudinal end of said photosensitive drum, wherein when said rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly.

15. A process cartridge according to claim 14, wherein said projection is in the form of a twisted polygonal prism and is projected from an end of a shaft projected outwardly in the longitudinal direction from said photosensitive drum, and said shaft functions to rotatably support said photosensitive drum in a cartridge frame and said recess is in the form of a twisted polygon.

16. A process cartridge according to claim 15, wherein said shaft is provided substantially at a center of a helical gear, and at a side of said helical gear opposite from said shaft, there is provided an engaging portion for engagement with an inner surface of said photosensitive drum, wherein said projection, helical gear, engaging portion and shaft are of integrally molded resin material, and the helical gear transmits a driving force to a developing roller as said process means.

17. A process cartridge according to claim 14 or 16, further comprising a circular or arcuate wall extending around said projection, wherein said wall functions as a guide for engagement between said recess and projection.

18. A process cartridge according to claim 16, wherein said projection comprises a substantially triangular prism, wherein an outer diameter D1 of said photosensitive drum, an outer diameter F of said shaft and a diameter C of a circumscribed circle of said substantially triangular prism, satisfy:

$D1 > F \geq C$.

19. A process cartridge according to claim 14 or 16, wherein said recess has a substantially triangular cross-section, and said projection has a substantially triangular cross-section, and wherein corners of triangular shape are beveled.

20. A process cartridge according to claim 14, further comprising a first portion to be urged by a spring of the main assembly and a second portion to contact a fixed portion of the main assembly, when said process cartridge is mounted to the main assembly.

21. A process cartridge according to claim 14, wherein said process means contains at least one of charging means, developing means and cleaning means.

22. A process cartridge according to claim 14, wherein said recess has a twisted configuration, and said projection is in the form of a substantially polygonal flat plate.

23. An electrophotographic image forming apparatus, for forming an image on a recording material, to which a process cartridge is detachably mountable comprising:

a motor;

a driving rotatable member for receiving a driving force from said motor;

a recess formed substantially at a center of said rotatable member, said recess having a polygonal cross-section;

means for detachably mounting the process cartridge which includes:

an electrophotographic photosensitive drum;

process means actable on said photosensitive drum; and a projection provided at a longitudinal end of said photosensitive drum, wherein when said rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and said apparatus further comprising:

means for feeding the recording material.

24. An apparatus according to claim 23, wherein a shaft is provided substantially at a center of a helical gear, and at a side of the helical gear opposite from said shaft, there is provided an engaging portion for engagement with an inner surface of said photosensitive drum, wherein said projection, helical gear, engaging portion and shaft are of integrally molded resin material, and the helical gear transmits the driving force to a developing roller as said process means.

25. An apparatus according to claim 23, further comprising a first portion to be urged by a spring of the main assembly and a second portion to contact a fixed portion of the main assembly, when said process cartridge is mounted to the main assembly.

26. An apparatus according to claim 23, wherein said process means contains at least one of charging means, developing means and cleaning means.

27. An apparatus according to claim 23, wherein said main assembly side driving rotatable member is a helical gear.

28. An apparatus according to claim 23, wherein said projection comprises a substantially triangular prism, wherein an outer diameter F of a shaft, a diameter C of a circumscribed circle of said substantially triangular prism, a dedendum diameter G of a drum gear of said photosensitive drum and an inner diameter of said photosensitive drum D2, satisfy:

$G > D2$, and $G > F \geq C$.

29. An apparatus according to claim 23, wherein an outer diameter D1 of said photosensitive drum and dedendum diameter L of said main assembly side driving rotatable member, which is a gear, satisfy, $1.0 \times D1 < L < 5.0 \times D1$.

30. An apparatus according to claim 23, wherein said main assembly side driving rotatable member, which is a gear, has a module of 0.4–0.7 and has a dedendum diameter L of 30–150 mm, and further has 40–400 teeth.

31. An apparatus according to claim 23, further comprising an openable cover for permitting mounting and demounting of said process cartridge relative to said main assembly, and moving means for moving said recess away from said projection in interrelation with opening of said cover, and for moving said recess toward said projection in interrelation with closing of said cover.

32. An apparatus according to claim 23, wherein said recess has a twisted configuration, and said projection is in the form of a substantially polygonal flat plate.

33. An electrophotographic image forming apparatus for forming an image on a recording material, comprising:

an electrophotographic photosensitive drum;

charging means for charging said photosensitive drum;

developing means for developing a latent image formed on said photosensitive drum into a toner image;

tranfer means for transferring the toner image onto the recording material;

fixing means for fixing the toner image on the recording material;

a motor;

a driving rotatable member for receiving a driving force from said motor;

a twisted recess formed substantially at a center of said rotatable member, said recess having a polygonal cross-section;

a twisted prism projection provided at a longitudinal end of said photosensitive drum, wherein when said side rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said electrophotographic photosensitive drum is positioned in place in a longitudinal direction of said photosensitive drum relative to the main assembly.

34. An apparatus according to claim 33, wherein said recess is formed in an end of a first column projected from said rotatable member, and said projection is projected from an end of a shaft projected outwardly in the longitudinal direction from said photosensitive drum.

35. An apparatus according to claim 33 or 34, further comprising a drum gear, wherein said projection is provided at a drum gear side of said photosensitive drum, and said drum gear functions to transmit the driving force to a developing roller as said developing means.

36. An apparatus according to claim 35, wherein said main assembly side driving rotatable member and drum gear are helical gears.

37. An apparatus according to claim 33, further comprising a circular or arcuate wall extending around said projection, said wall functions as a guide for engagement between said recess and projection.

38. An apparatus according to claim 34, wherein said projection comprises a substantially triangular prism, wherein an outer diameter D1 of said photosensitive drum, an outer diameter F of said shaft and a diameter C of a circumscribed circle of said substantially triangular prism, satisfy:

D1>F≧C.

39. An apparatus according to claim 34, wherein said projection comprises a substantially triangular prism, wherein an outer diameter F of said shaft, a diameter C of a circumscribed circle of said substantially triangular prism, a dedendum diameter G of a drum gear of said photosensitive drum and an inner diameter of said photosensitive drum D2, satisfy:

G>D2, and G>F≧C.

40. An apparatus according to claim 33 or 37, wherein an outer diameter D1 of said photosensitive drum and dedendum diameter L of said main assembly side driving rotatable member, which is a gear, satisfy 1.0×D1≦L≦5.0×D1.

41. An apparatus according to claim 33 or 37, wherein said main assembly side driving rotatable member, which is a gear, has a module of 0.4–0.7 and has a dedendum diameter L of 30–150 mm, and further has 40–400 teeth.

42. An apparatus according to claim 33 or 37, wherein said recess has a substantially triangular cross-section, and said projection has a substantially triangular cross-section, and wherein corners of triangular shape are beveled.

43. An apparatus according to claim 33, wherein said photosensitive drum and at least one of said charging means and said developing means are contained in a process cartridge which is detachably mountable.

44. An apparatus according to claim 33, further comprising an openable cover for permitting mounting and demounting of said process cartridge relative to said main assembly, and moving means for moving said recess away from said projection in interrelation with opening of said cover, and for moving said recess toward said projection in interrelation with closing of said cover.

45. A process cartridge detachably mountable to a main assembly of an image forming apparatus, wherein said main assembly includes a motor, a driving rotatable member for receiving a driving force from said motor and a twisted recess formed substantially at a center of said rotatable member, said recess having a polygonal cross-section; said process cartridge comprising:

an electrophotographic photosensitive drum;

process means actable on said photosensitive drum; and a twisted polygonal prism projection provided at a longitudinal end of said photosensitive drum, wherein when said driving rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly.

46. A process cartridge according to claim 45, wherein said projection is projected from an end of a shaft projected outwardly in the longitudinal direction from said photosensitive drum, and said shaft functions to rotatably support said photosensitive drum in a cartridge frame.

47. A process cartridge according to claim 46, wherein said shaft is provided substantially at a center of a helical gear, and at a side of said helical gear opposite from said shaft, there is provided an engaging portion for engagement with an inner surface of said photosensitive drum, wherein said projection, helical gear, engaging portion and shaft are of integrally molded resin material, and the helical gear transmits a driving force to a developing roller as said process means.

48. A process cartridge according to claim 45 or 47, further comprising a circular or arcuate wall extending around said projection wherein, said wall functions as a guide for engagement between said recess and projection.

49. A process cartridge according to claim 47, wherein said projection comprises a substantially triangular prism, wherein an outer diameter D1 of said photosensitive drum an outer diameter F of said shaft and a diameter C of a circumscribed circle of said substantially triangular prism, satisfy:

$D1 > F \geqq C$.

50. A process cartridge according to claim 45 or 47, wherein said recess has a substantially triangular cross-section, and said projection has a substantially triangular cross-section, and wherein corners of triangular shape are beveled.

51. A process cartridge according to claim 45, further comprising a first portion to be urged by a spring of the main assembly and a second portion to contact a fixed portion of the main assembly, when said process cartridge is mounted to the main assembly.

52. A process cartridge according to claim 45, wherein said process means contains at least one of charging means, developing means and cleaning means.

53. An electrophotographic image forming apparatus, for forming an image on a recording material, to which a process cartridge is detachably mountable comprising:
    a motor;
    a driving rotatable member for receiving a driving force from said motor;
    a twisted recess formed substantially at a center of said rotatable member, said recess having a polygonal cross-section,
    means for detachably mounting a process cartridge which includes:
        an electrophotographic photosensitive drum;
        process means actable on said photosensitive drum; and
        a twisted polygonal prism projection provided at a longitudinal end of said photosensitive drum, wherein when said rotatable member rotates with said recess and projection engaged with each other, a rotational driving force is transmitted from said rotatable member to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and
    said apparatus further comprising:
        means for feeding the recording material.

54. An apparatus according to claim 53, wherein a shaft is provided substantially at a center of a helical gear, and at a side of said helical gear opposite from said shaft, there is provided an engaging portion for engagement with an inner surface of said photosensitive drum, wherein said projection, helical gear, engaging portion and shaft are of integrally molded resin material, and the helical gear transmits a driving force to a developing roller as said process means.

55. An apparatus according to claim 53, further comprising a first portion to be urged by a spring of the main assembly and a second portion to contact a fixed portion of the main assembly, when said process cartridge is mounted to the main assembly.

56. An apparatus according to claim 53, wherein said process means contains at least one of charging means, developing means and cleaning means.

57. An apparatus according to claim 56, wherein said main assembly side driving rotatable member and a drum gear, which rotates a developing roller as said process means, are helical gears.

58. An apparatus according to claim 53, wherein said projection comprises a substantially triangular prism, wherein an outer diameter F of a shaft wherein said shaft is projected outwardly in the longitudinal direction from said photosensitive drum, a diameter C of a circumscribed circle of said substantially triangular prism, a dedendum diameter G of a drum gear of said photosensitive drum for rotating a developing roller as said process means and an inner diameter of said photosensitive drum D2, satisfy:

$G > D2$, and $G > F \geqq C$.

59. An apparatus according to claim 53, wherein an outer diameter D1 of said photosensitive drum and dedendum diameter L of said rotatable member, which is a gear, satisfy, $1.0 \times D1 < L < 5.0 \times D1$.

60. An apparatus according to claim 53, wherein said rotatable member, which is a gear, has a module of 0.4–0.7 and has a dedendum diameter L of 30–150 mm. and further has 40–400 teeth.

61. An apparatus according to claim 53, further comprising an openable cover for permitting mounting and demounting of said process cartridge relative to said main assembly, and moving means for moving said recess away from said projection in interrelation with opening of said cover, and for moving said recess toward said projection in interrelation with closing of said cover.

62. A process cartridge detachably mountable to a main assembly of an image forming apparatus, wherein said main assembly includes a motor, a helical gear for receiving a driving force from said motor and a twisted recess formed substantially at a center of said helical gear, said recess having a substantially triangular cross-section;
    said process cartridge comprising:
        a cartridge frame;
        an electrophotographic photosensitive drum;
        a developing roller for developing a latent image formed on said photosensitive drum; and
        a twisted substantially triangular prism projection provided at a longitudinal end of said photosensitive drum, wherein when said helical gear rotates with said recess and projection engaged with each other, a rotational driving force is transmitted from said helical gear to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and wherein said projection is provided at an end of a shaft provided substantially at a center of a drum helical gear for transmitting a rotational force to said developing roller, and wherein said shaft functions to rotatably support said photosensitive drum in said cartridge frame.

63. A process cartridge according to claim 62, wherein at a side of said drum helical gear opposite from said shaft, there is provided an engaging portion for engagement with an inner surface of said photosensitive drum, wherein said projection, drum helical gear, engaging portion and shaft are of integrally molded resin material.

64. A process cartridge according to claim 62, further comprising a circular or arcuate wall extending around said projection, said wall functions as a guide for engagement between said recess and projection.

65. A process cartridge according to claim 62 or 63, wherein an outer diameter F of said shaft, a diameter C of a circumscribed circle of said substantially triangular prism, a dedendum diameter G of the drum helical gear of said photosensitive drum for rotating said developing roller, and an inner diameter of said photosensitive drum D2, satisfy:

G>D2, and G>F≧C.

66. A process cartridge according to claim 62, wherein corners of said projection are beveled.

67. A process cartridge according to claim 62, further comprising a first portion to be urged by a spring and a second portion to contact a fixed portion of the main assembly, when said process cartridge is mounted to the main assembly.

68. A process cartridge according to claim 62, wherein said process cartridge further contains at least one of a charging roller and a cleaning blade.

69. An electrophotographic image forming apparatus, for forming an image on a recording material, to which a process cartridge is detachably mountable comprising:

a motor;

main assembly helical gear for receiving a driving force from said motor;

a twisted recess formed substantially at a center of said helical gear, said recess having a substantially triangular cross-section;

means for detachably mounting a process cartridge which includes:

a cartridge frame;

an electrophotographic photosensitive drum;

a developing roller for developing a latent image formed on said photosensitive drum;

a twisted substantially triangular prism projection provided at a longitudinal end of said photosensitive drum, wherein when said helical gear rotates with said recess and projection engaged with each other, a rotational driving force is transmitted from said helical gear to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and wherein said projection is provided at an end of a shaft provided substantially at a center of a drum helical gear for transmitting a rotational force to said developing roller, and wherein said shaft functions to rotatably support said photosensitive drum in said cartridge frame;

said apparatus further comprising:

means for feeding the recording material.

70. An apparatus according to claim 69, wherein at a side of said helical gear opposite from said shaft, there is provided an engaging portion for engagement with an inner surface of said photosensitive drum, wherein said projection, drum helical gear, engaging portion and shaft are of integrally molded resin material.

71. An apparatus according to claim 69, further comprising a first portion to be urged by a spring and a second portion to contact a fixed portion of the main assembly, when said process cartridge is mounted to the main assembly.

72. An apparatus according to claim 69, wherein said process means contains at least one of a charging member and a cleaning member.

73. An apparatus according to claim 69, wherein an outer diameter F of said shaft, a diameter C of a circumscribed circle of said substantially triangular prism, a dedendum diameter G of the gear of said photosensitive drum and a inner diameter D2 of said photosensitive drum, satisfy:

G>D2, and G>F≧C.

74. An apparatus according to claim 69, wherein an outer diameter D1 of said photosensitive drum and dedendum diameter L of said main assembly helical gear, satisfy 1.0×D1<L<5.0×D1.

75. An apparatus according to claim 69, wherein said main assembly gear has a module of 0.4–0.7 and has a dedendum diameter L of 30–150 mm, and further has 40–400 teeth.

76. An apparatus according to claim 69, further comprising an openable cover for permitting mounting and demounting of said process cartridge relative to said main assembly, and moving means for moving said recess away from said projection in interrelation with opening of said cover, and for moving said recess toward said projection in interrelation with closing of said cover.

77. A process cartridge detachably mountable to a main assembly of an image forming apparatus, wherein said main assembly includes a motor, a main assembly helical gear for receiving a driving force from said motor and a twisted recess formed substantially at a center of said helical gear, said recess having a substantially triangular cross-section; said process cartridge comprising:

a cartridge frame;

an electrophotographic photosensitive drum;

a developing roller for developing a latent image formed on said photosensitive drum; and a cleaning blade for removing residual toner from said photosensitive drum;

a twisted substantially triangular prism projection provided at a longitudinal end of said photosensitive drum, wherein when said helical gear rotates with said recess and projection engaged with each other, a rotational driving force is transmitted from said helical gear to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and wherein said projection is provided at an end of a shaft provided substantially at a center of a drum helical gear for transmitting a rotational force to said developing roller, and wherein said shaft functions to rotatably support said photosensitive drum in said cartridge frame, and wherein said projection, drum helical gear and shaft are of integrally molded resin material, and an outer diameter D1 of said photosensitive drum, an outer diameter F of said shaft and a diameter C of a circumscribed circle of said substantially triangular prism, satisfy:

D1>F≧C.

78. A process cartridge according to claim 77, wherein at a side of said drum helical gear opposite from said shaft, there is provided an engaging portion for engagement with an inner surface of said photosensitive drum, wherein said projection, drum helical gear, engaging portion and shaft are of integrally molded resin material.

79. A process cartridge according to claim 77, further comprising a circular or arcuate wall extending around said projection, said wall functions as a guide for engagement between said recess and projection.

80. A process cartridge according to claim 77, wherein corners of said projection are beveled.

81. A process cartridge according to claim 77, further comprising a first portion to be urged by a spring and a second portion to contact a fixed portion of the main assembly, when said process cartridge is mounted to the main assembly.

82. An electrophotographic image forming apparatus, for forming an image on a recording material, to which a process cartridge is detachably mountable comprising:

a motor;

a main assembly helical gear for receiving driving force from said motor;

a twisted recess formed substantially at a center of said helical gear, said recess having a substantially triangular cross-section, said recess being formed in an end of a circular column projected from a substantially central portion of said helical gear;

means for detachably mounting a process cartridge which includes:
      a cartridge frame;
      an electrophotographic photosensitive drum;
      a developing roller for developing a latent image formed on said photosensitive drum; and
      a cleaning blade for removing residual toner from said photosensitive drum;
      a twisted substantially triangular prism projection provided at a longitudinal end of said photosensitive drum, wherein when said helical gear rotates with said recess and projection engaged with each other, a rotational driving force is transmitted from said helical gear to said photosensitive drum through said recess and said projection with said projection being pulled into said recess, wherein a free end of said projection and a bottom surface of said recess contact each other so that said photosensitive drum is positioned in place in a longitudinal direction of said photosensitive drum relative to the main assembly; and wherein said projection is provided at an end of a shaft provided substantially at a center of a drum helical gear for transmitting a rotational force to said developing roller, and wherein said shaft functions to rotatably support said photosensitive drum in said cartridge frame, and wherein said projection, drum helical gear and shaft are of integrally molded resin material, and an outer diameter D1 of said photosensitive drum, an outer diameter F of said shaft and a diameter C of a circumscribed circle of said substantially triangular prism, satisfy:
      $D1 > F \geqq C$;

said apparatus further comprising:
      an openable cover for permitting mounting and demounting of said process cartridge relative to said main assembly;
      moving means for moving said recess away from said projection in interrelation with opening of said cover, and for moving said recess toward said projection in interrelation with closing of said cover to engage said projection with said recess; and
      means for feeding the recording material.

83. An apparatus according to claim 82, wherein said main assembly helical gear has a module of 0.4–0.7 and has a dedendum diameter L of 30–150 mm, and further has 40–400 teeth.

* * * * *

UNITED STATES PATENT AND TRADEMARK OFFICE
CERTIFICATE OF CORRECTION

PATENT NO. : 6,226,478 B1
DATED : May 1, 2001
INVENTOR(S) : Kazushi Watanabe et al.

It is certified that error appears in the above-identified patent and that said Letters Patent is hereby corrected as shown below:

Column 1,
Line 34, "type" should read -- type is --.

Column 2,
Line 17, "is" should read -- is a -- and "a" should read -- of a --; and
Line 38, "10 a" should read -- 10 is a --.

Column 3,
Line 22, "and" should read -- an --; and
Line 24, "coupling" should read -- coupling of --.

Column 4,
Line 5, "FIG." should read -- FIGS. --.

Column 5,
Line 23, "15a 15b" should read -- 15a, 15b --; and
Line 61, "FIG.11" should read -- and FIG. 11 --.

Column 6,
Line 3, "an" should read -- on an --;
Line 39, "to" should be deleted; and
Line 64, "d0" should read -- d1 --.

Column 7,
Line 12, "three dimensional" should read -- three- dimensional --;
Line 13, "there" should read -- three -- and
Line 28, "16" should read -- 16 is --.

Column 10,
Line 32, "are" should read -- are an --; and
Line 43, "(FIG." should read -- (FIGS. --.

Column 11,
Line 40, "to" should be deleted;
Line 48, "ing and demounting" should read -- ing- and - demounting --; and
Line 66, "of embodiment the" should read -- of the embodiment is --.

UNITED STATES PATENT AND TRADEMARK OFFICE
CERTIFICATE OF CORRECTION

PATENT NO. : 6,226,478 B1
DATED : May 1, 2001
INVENTOR(S) : Kazushi Watanabe et al.

It is certified that error appears in the above-identified patent and that said Letters Patent is hereby corrected as shown below:

Column 12,
Line 14, "assembly" should read -- assembly, --;
Line 15, "wherein," should read -- wherein --; and
Line 33, "material" (first occurrence) should be deleted.

Column 13,
Line 36, "to" should be deleted.

Column 16,
Line 3, "is abutted to" should read -- abuts --;
Line 4, "is abutted" should read -- abuts --;
Line 5, "to" should be deleted;
Line 35, "is views" should read -- is a view --;
Line 64, "to" should be deleted;
Line 66, "ther-" should read -- there- --;
Line 67, "ebetwen" should read -- between --; and
Line 67, "assure." should read -- assured. --.

Column 18,
Line 41, "B the" should read -- B, the --.

Column 19,
Line 6, "mounted" should read -- mounted to --; and
Line 32, "The" should read -- The main assembly --.

Column 20,
Line 50, "the drum 107, drum" should read -- drum 107, the drum --; and
Line 54, "a" should read -- an --.

Column 21,
Line 12, "insertion" should read -- inserted --.

Column 23,
Line 27, "polygonal." should read -- polygonal shape. --;
Line 48, "to" should be deleted; and
Line 51, "137 in." should read -- 137. --.

UNITED STATES PATENT AND TRADEMARK OFFICE
CERTIFICATE OF CORRECTION

PATENT NO. : 6,226,478 B1
DATED : May 1, 2001
INVENTOR(S) : Kazushi Watanabe et al.

It is certified that error appears in the above-identified patent and that said Letters Patent is hereby corrected as shown below:

Column 24,
Line 16, "to" (first occurrence) should be deleted;
Line 29, "recess" should read -- recess of --; and
Line 44, "to" should be deleted.

Column 25,
Line 6, "to" should be deleted;
Line 19, "to" should be deleted; and
Line 28, "In" should read -- In the --.

Column 28,
Line 32, "claim 1" should read -- claim 1, --.

Column 31,
Line 28, "section;" should read -- section; and --.

Column 32,
Line 9, "satisfy" should read -- satisfy: --.

Column 33,
Line 1, "wherein," should read -- ,wherein --;
Line 5, "drum" should read -- drum, --; and
Line 31, "section," should read -- section; --.

Column 34,
Line 16, "satisfy," should read -- satisfy: --;
Line 17, "1.0 x D1 < L < 5.0 x D1." should read -- $1.0 \times D1 \leq L \leq 5.0 \times D1.$ --;
Line 20, "mm." should read -- mm, --; and
Line 57, "assembly;" should read -- assembly, --.

Column 35,
Line 22, "main" should read -- a main --;
Line 44, "assembly; and" should read -- assembly, --; and
Line 51, "frame;" should read -- frame; and --.

UNITED STATES PATENT AND TRADEMARK OFFICE
CERTIFICATE OF CORRECTION

PATENT NO. : 6,226,478 B1
DATED : May 1, 2001
INVENTOR(S) : Kazushi Watanabe et al.

It is certified that error appears in the above-identified patent and that said Letters Patent is hereby corrected as shown below:

Column 36,
Line 9, "1.0 x D1 < L < 5.0 x D1." should read -- $1.0 \times D1 \leqq L \leqq 5.0 \times D1$. --;
Line 31, "drum; and" should read -- drum; --;
Line 33, "drum;" should read -- drum; and --; and
Line 46, "assembly;" should read -- assembly, --.

Column 37,
Line 24, "drum; and" should read -- drum; --; and
Line 26, "drum;" should read -- drum ; and --.

Column 38,
Line 5, "assembly;" should read -- assembly, --.

Signed and Sealed this

Nineteenth Day of August, 2003

JAMES E. ROGAN
*Director of the United States Patent and Trademark Office*